(12) United States Patent
Kozorovitskiy et al.

(10) Patent No.: US 10,802,255 B2
(45) Date of Patent: Oct. 13, 2020

(54) SCANNED OBLIQUE PLANE ILLUMINATION MICROSCOPY

(71) Applicant: NORTHWESTERN UNIVERSITY, Evanston, IL (US)

(72) Inventors: Yevgenia Kozorovitskiy, Evanston, IL (US); Manish Kumar, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 16/388,466

(22) Filed: Apr. 18, 2019

(65) Prior Publication Data
US 2019/0324244 A1 Oct. 24, 2019

Related U.S. Application Data

(60) Provisional application No. 62/659,799, filed on Apr. 19, 2018.

(51) Int. Cl.
*G02B 21/00* (2006.01)
*G06T 3/00* (2006.01)
(Continued)

(52) U.S. Cl.
CPC ....... *G02B 21/0072* (2013.01); *G02B 21/008* (2013.01); *G02B 21/0032* (2013.01);
(Continued)

(58) Field of Classification Search
CPC ............ G02B 21/0071; G02B 21/0032; G02B 21/0048; G02B 21/008; G02B 21/367; G06T 3/0006; G06T 15/08; G06T 2200/04
(Continued)

(56) References Cited

U.S. PATENT DOCUMENTS 8,619,237 B2 12/2013 Hillman et al.
2008/0277567 A1* 11/2008 Doran ................ G01N 21/4795
250/227.2
(Continued)

OTHER PUBLICATIONS

Dombeck et al., "Functional imaging of hippocampal place cells at cellular resolution during virtual navigation," Nat. Neurosci., vol. 13, No. 11, Nov. 2010, pp. 1433-1440.
(Continued)

*Primary Examiner* — Hee-Yong Kim
(74) *Attorney, Agent, or Firm* — Bell & Manning, LLC

(57) ABSTRACT

A microscopy system includes a first excitation source configured to emit a one-photon light beam and a second excitation source configured to emit a two-photon light beam. The system also includes a first optical component configured to deliver one or more of a one-photon light sheet and a two-photon light sheet, where the one-photon light sheet is based on the one-photon light beam and the two-photon light sheet is based on the two-photon light beam. The system further includes a single reflective surface at a back focal plane of the first optical component to reflect the one or more of the one-photon light sheet and the two-photon light sheet toward a sample. The single reflective surface rotates about a fixed axis situated at a cross section of the single reflective surface and the back focal plane of the first optical component.

20 Claims, 25 Drawing Sheets

(51) Int. Cl.
  *G06T 15/08* (2011.01)
  *G02B 21/36* (2006.01)
(52) U.S. Cl.
  CPC ....... *G02B 21/0048* (2013.01); *G02B 21/367* (2013.01); *G06T 3/0006* (2013.01); *G06T 15/08* (2013.01); *G06T 2200/04* (2013.01)
(58) Field of Classification Search
  USPC .......................................................... 348/79
  See application file for complete search history.

(56) References Cited

U.S. PATENT DOCUMENTS

2016/0327779 A1* 11/2016 Hillman ................. G02B 23/04
2019/0212535 A1* 7/2019 Knebel ................. G02B 21/367

OTHER PUBLICATIONS

Hell et al., "Breaking the diffraction resolution limit by stimulated emission: stimulated-emission-depletion fluorescence microscopy," Opt. Lett., vol. 19, No. 11, Jun. 1, 1994, pp. 780-782.
Rust et al., "Sub-diffraction-limit imaging by stochastic optical reconstruction microscopy (STORM)," Nature Methods, vol. 3, No. 10, Oct. 20016, pp. 793-795.
Hess et al., "Ultra-high resolution imaging by fluorescence photoactivation localization microscopy," Biophys. J., vol. 91, No. 11, Dec. 2006, pp. 4258-4272.
Gustafsson, "Surpassing the lateral resolution limit by a factor of two using structured illumination microscopy," J. Microsc., vol. 198, Pt. 2, May 2000, pp. 82-87.
Theer et al., "Two-photon imaging to a depth of 1000 µm in living brains by use of a Ti: $Al_2O_3$ regenerative amplifier," Opt. Lett., vol. 28, No. 12, Jun. 15, 2003, pp. 1022-1024.
Levoy et al., "Light field microscopy," ACM Trans. Graph., vol. 25, No. 3, 2006, p. 924.
Nöbauer et al., "Video rate volumetric $Ca^{2+}$ imaging across cortex using seeded iterative demixing (SID) microscopy," Nature Methods, vol. 14, No. 8, Aug. 2017, pp. 811-818.
Siedentopf et al., "Uber Sichtbarmachung and Größenbestimmung ultramikoskopischer Teilchen, mit besonderer Anwendung auf Goldrubingläser," Ann. Phys., vol. 315, No. 1, 1902, pp. 1-39.
Huisken et al., "Optical sectioning deep inside live embryos by selective-plane illumination microscopy," Science, vol. 305, (5686), Aug. 13, 2004, pp. 1007-1009.
Engelbrecht et al., "Resolution enhancement in a light-sheet-based microscope (SPIM)," Opt. Lett. vol. 31, No. 10, May 15, 2006, pp. 1477-1479.
Keller et al., "Reconstruction of zebrafish early embryonic development by scanned light-sheet microscopy," Science, vol. 322, (5904), Nov. 14, 2008, pp. 1065-1069.
Vladimirov et al., "Light-sheet functional imaging in fictively behaving zebrafish," Nature Methods, vol. 11, No. 9, Sep. 2014, pp. 883-884.
Pitrone et al., "OpenSPIM: an open-access light-sheet microscopy platform," Nature Methods, vol. 10, No. 7, Jul. 2013, pp. 598-599.
Wu et al., "Inverted selective plane illumination microscopy (iSPIM) enables coupled cell identity lineaging and neurodevelopmental imaging in *Caenorhabditis elegans*," Proc Natl Acad Sci., vol. 108, No. 43, Oct. 25, 2011, pp. 17708-17713.
Huisken et al., "Even fluorescence excitation by multidirectional selective-plane illumination microscopy (mSPIM)," Opt. Lett., vol. 32, No. 17, Sep. 1, 2007, pp. 2608-2610.
Royer et al., "Adaptive light-sheet microscopy for long-term, high-resolution imaging in living organisms," Nat. Biotechnol., vol. 34, No. 12, Dec. 2016, pp. 1267-1278.
Dunsby, "Optically sectioned imaging by oblique-plane microscopy," Opt. Express, vol. 16, No. 25, Dec. 8, 2008, pp. 20306-20316.
Kumar et al., "High-speed 2D and 3D fluorescence microscopy of cardiac myocytes," Opt. Express, vol. 19, No. 15, Jul. 18, 2011, pp. 13839-13847.
Sikkel et al., "High speed sCMOS-based oblique plane microscopy applied to the study of calcium dynamics in cardiac myocytes," J. Biophotonics, vol. 9, No. 3, 2016, pp. 311-323.
Bouchard et al., "Swept confocally aligned planar excitation (SCAPE) microscopy for high-speed volumetric imaging of behaving organisms," Nature Photon., vol. 9, No. 2, Feb. 2015, pp. 113-119.
Shin et al., "Oblique scanning two-photon light sheet fluorescence microscopy for rapid volumetric imaging," J. Biophotonics., 2018, 11:e201700270, pp. 1-8.
Li et al., "Axial plane optical microscopy," Sci. Rep., vol. 4: 7253, 2014, pp. 1-6.
Joseph W. Goodman, "*Introduction to Fourier optics*," Roberts and Company Publishers, 2005, pp. 1-10.
Born et al., "*Principles of Optics*," Pergamon, 1983, pp. 1-11.
Edelstein et al., "Computer control of microscopes using µManager," Current protocols in molecular biology., Unit 14.20, Supplement 92, Oct. 2010, pp. 14.20.2-14.20.17.
Edelstein et al., "Advanced methods of microscope control using µManager software," Journal of biological methods, vol. 1, No. 2, 2014, pp. 1-10.
Meijering et al., "Quantitative Evaluation of Convolution-Based Methods for Medical Image Interpolation," Med. Image Anal., vol. 5, No. 2, 2001, pp. 111-126.
Schneider et al., "NIH Image to ImageJ: 25 years of image analysis," Nature Methods, vol. 9, No. 7, Jul. 2012, pp. 671-675.
Xiao et al., "Automatic optimal filament segmentation with sub-pixel accuracy using generalized linear models and B-spline level-sets," Med. Image Anal., vol. 32, 2016, pp. 157-172.
Schindelin et al., "Fiji: an open-source platform for biological-image analysis," Nature Methods, vol. 9, No. 7, Jul. 2012, pp. 676-682.
Royer et al., "ClearVolume: open-source live 3D visualization for light-sheet microscopy," Nature Methods, vol. 12, No. 6, Jun. 2015, pp. 480-481.
Shin et al., "Neural cell fate analysis in zebrafish using olig2 BAC transgenics," Methods Cell Sci., vol. 25, (1-2), 2003, pp. 7-14.
Satou et al., "Transgenic tools to characterize neuronal properties of discrete populations of zebrafish neurons," Development, vol. 140, No. 18, 2013, pp. 3927-3931.
Thiele et al., "Descending control of swim posture by a midbrain nucleus in zebrafish," Neuron, vol. 83, No. 3, Aug. 6, 2014, pp. 679-691.
Fahrbach et al., "Light-sheet microscopy in thick media using scanned Bessel beams and two-photon fluorescence excitation," Opt. Express, vol. 21, No. 11, Jun. 3, 2013, pp. 13824-13839.
Chen et al., "Lattice light-sheet microscopy: imaging molecules to embryos at high spatiotemporal resolution," Science, vol. 346, Issue 6208, Oct. 24, 2014, pp. 1257998-1-1257998-12.
Vettenburg et al., "Light-sheet microscopy using an Airy beam," Nature Methods., vol. 11, No. 5, May 2014, pp. 541-544.
Power et al., "A guide to light-sheet fluorescence microscopy for multiscale imaging," Nat. Methods, vol. 14, No. 4, Apr. 2017, pp. 360-373.
Kumar et al., "Integrated one- and two-photon scanned oblique plane illumination (SOPi) microscopy for rapid volumetric imaging," Opt. Express, vol. 26, No. 10, May 14, 2018, pp. 13027-13041.
Botcherby et al., "Aberration-free optical refocusing in high numerical aperture microscopy," Opt. Lett., vol. 32, No. 14, Jul. 15, 2007, pp. 2007-2009.
Preibisch et al., "Globally optimal stitching of tiled 3D microscopic image acquisitions," Bioinformatics, vol. 25, No. 11, 2009, pp. 1463-1465.
Hörl et al., "BigStitcher: Reconstructing high-resolution image datasets of cleared and expanded samples," Nature Methods, vol. 16, Sep. 2019, pp. 870-874.
Pietzsch et al., "BigDataViewer: visualization and processing for large image data sets," Nat. Methods, vol. 12, No. 6, Jun. 2015, pp. 481-483.

(56) References Cited

OTHER PUBLICATIONS

Fahrbach et al., "Microscopy with self-reconstructing beams," Nat. Photonics, vol. 4, No. 11, Nov. 2010, pp. 780-785.

* cited by examiner

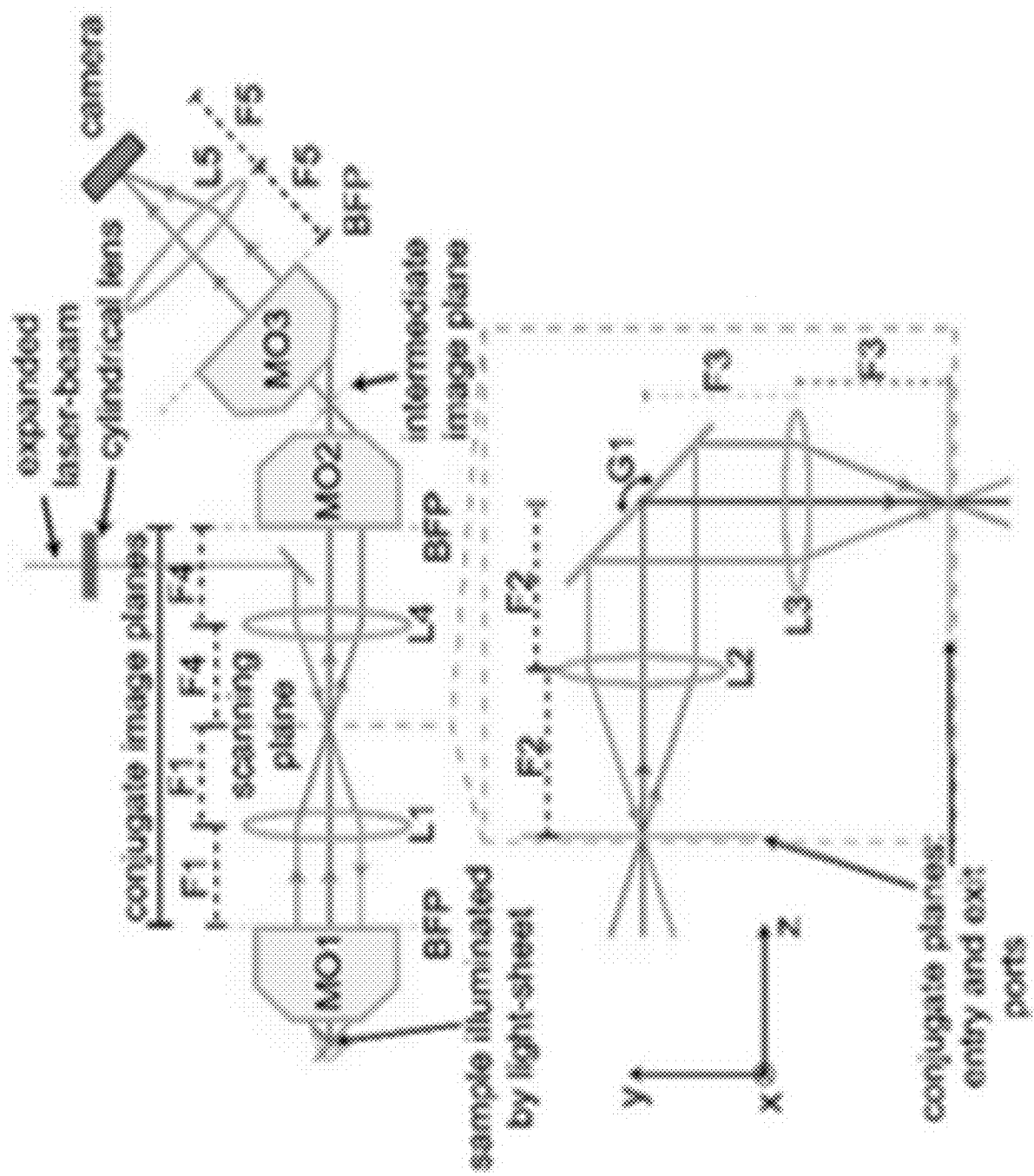

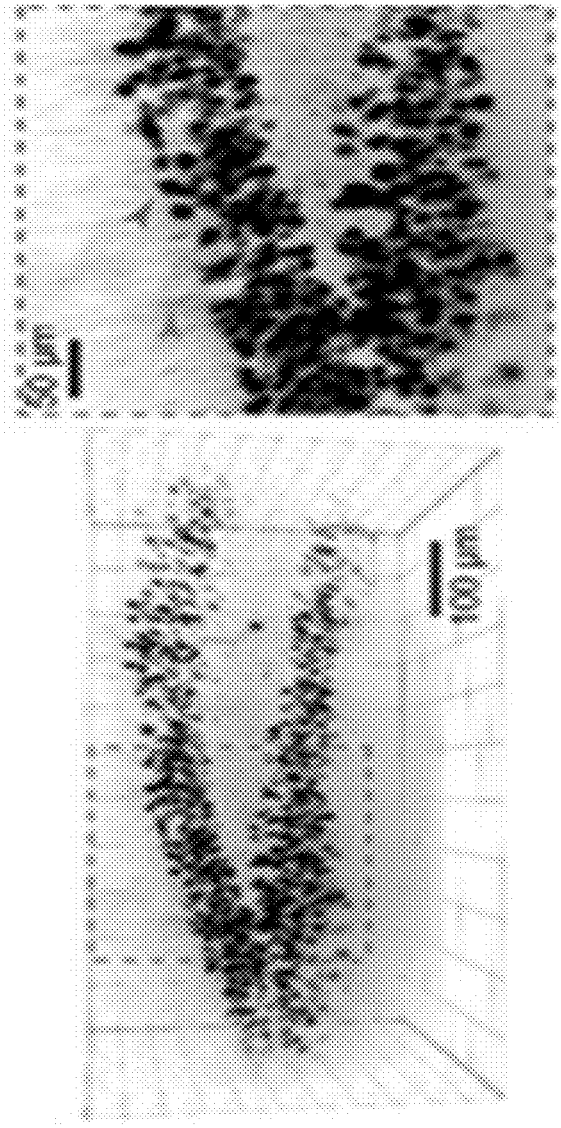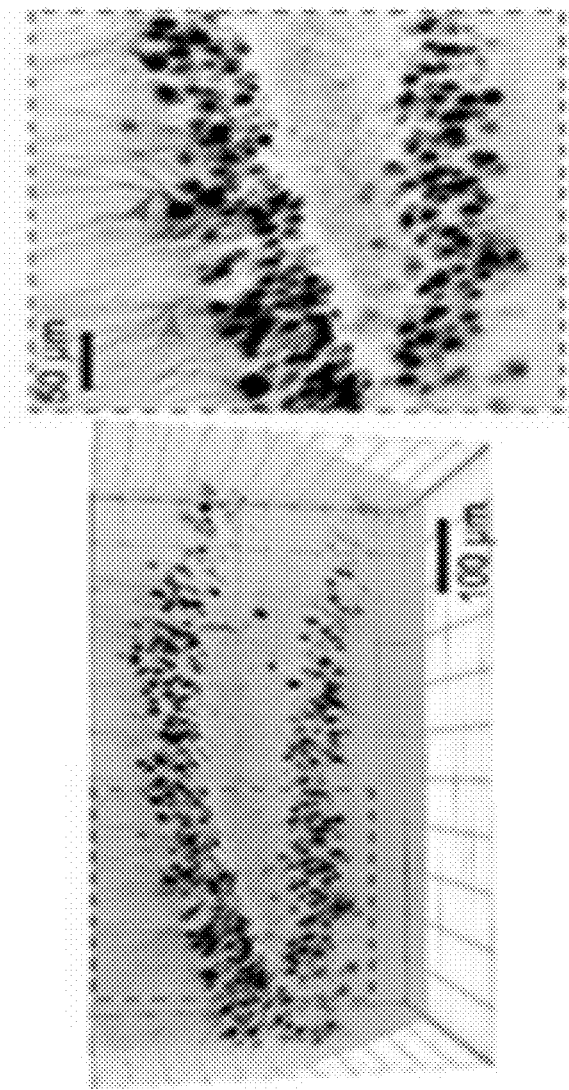

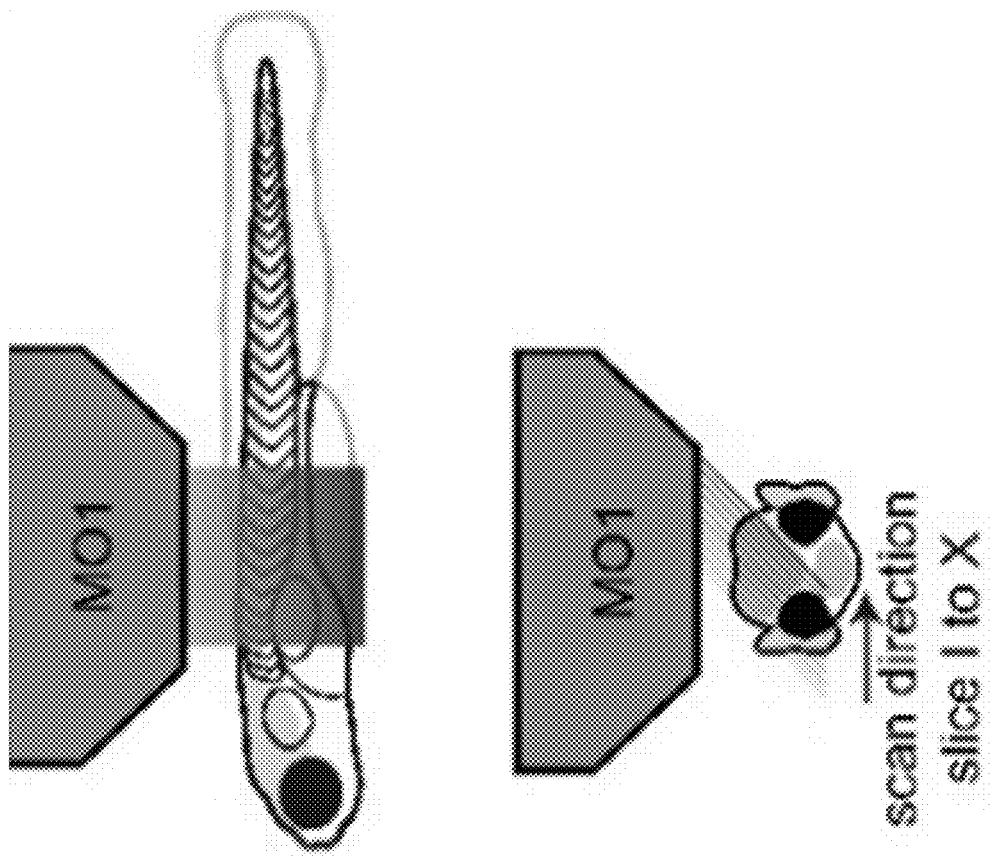

SCANNED OBLIQUE PLANE ILLUMINATION MICROSCOPY

CROSS-REFERENCE TO RELATED APPLICATION

The present application claims the priority benefit of U.S. Provisional Patent App. No. 62/659,799 filed on Apr. 19, 2018, the entire disclosure of which is incorporated by reference herein.

STATEMENT REGARDING FEDERALLY SPONSORED RESEARCH

This invention was made with government support under R01MH117111 awarded by the National Institute of Mental Health (NIMH). The government has certain rights in the invention.

BACKGROUND

Light-sheet microscopy is a powerful imaging technique that can provide improved resolution as compared to other microscopy techniques. Light-sheet microscopy also provides a reduced scattering effect and high-speed functional imaging capability. A conventional light-sheet microscope includes an illumination arm that is arranged orthogonally to an upright detection arm. The illumination arm relies on a cylindrical lens to focus a collimated beam to form a sheet of light, which in turn provides optical sectioning of tissue samples. The detection arm forms a magnified image of the optically sectioned plane. The axial resolution of a light-sheet microscope depends in part on the detection objective numerical aperture (NA) and the light-sheet thickness.

SUMMARY

An illustrative microscopy system includes a first excitation source configured to emit a one-photon light beam and a second excitation source configured to emit a two-photon light beam. The system also includes a first optical component configured to deliver one or more of a one-photon light sheet and a two-photon light sheet, where the one-photon light sheet is based on the one-photon light beam and the two-photon light sheet is based on the two-photon light beam. The system further includes a single reflective surface at a back focal plane of the first optical component to reflect the one or more of the one-photon light sheet and the two-photon light sheet toward a sample. The single reflective surface rotates about a fixed axis situated at a cross section of the single reflective surface and the back focal plane of the first optical component.

An illustrative method of forming images with a microscopy system includes positioning a first excitation source such that a one-photon light beam emitted from the first excitation source is configured to contact a galvanometer mounted planar reflector at an offset relative to a rotation axis of the galvanometer mounted planar reflector. The method also includes positioning a second excitation source such that a two-photon light beam emitted from the second excitation source is configured to contact the galvanometer mounted planar reflector at the offset relative to the rotation axis of the galvanometer mounted planar reflector. The method also includes positioning the galvanometer mounted planar reflector at an angle relative to both the one-photon light beam and the two-photon light beam, where the galvanometer mounted planar reflector rotates about a fixed axis. The method also includes aligning a first microscope objective, on a first side of the galvanometer mounted planar reflector such that a back focal plane of the first microscope objective is located, conjugated, or imaged at the rotation axis of the galvanometer mounted planar reflector. The first microscope objective is configured to direct one or more of a one-photon light sheet and a two-photon light sheet toward a sample. The method also includes aligning a second microscope objective, on a second side of the galvanometer mounted planar reflector, such that a back focal plane of the second microscope objective is located, conjugated, or imaged at the rotation axis of the galvanometer mounted planar reflector. The second microscope objective is configured to direct the one or more of the one-photon light sheet and the two-photon light sheet toward the sample. The method also includes receiving, by the first microscope objective, reflected, scattered, or emitted light signals coming from different depths of the sample. The light signals are produced due to interaction of the one or more of the one-photon light sheet and the two-photon light sheet with the sample. The method further includes forming, based on the received light signals refracted through the second microscope objective, an intermediate stationary image of a scanned oblique section within the sample.

Another illustrative microscopy system includes a first excitation source configured to emit a first one-photon light beam to excite a first one-photon light signal and a second excitation source configured to emit a second one-photon light beam to excite a second one-photon light signal. The system also includes a dichroic mirror configured to combine and co-align the first one-photon excitation beam and the second one-photon excitation beam. The method also includes a first objective lens, a second objective lens, and a third objective lens, where a back focal plane of the first objective lens is conjugate to a back focal plane of the second objective lens, and where the third objective lens forms a magnified image. The system also includes a first galvanometer and a second galvanometer. A first rotation axis of the first galvanometer and a second rotation axis of the second galvanometer lie in conjugate planes of one another, and the first rotation axis and the second rotation axis also lie in conjugation with the back focal plane of the first objective lens and the back focal plane of the second objective lens. The second galvanometer is configured to create a scanned light-sheet from one or more of the first one-photon excitation beam and the second one-photon excitation beam. The system further includes a multiband dichroic mirror configured to reflect the scanned light-sheet toward a sample to be imaged.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A depicts a scanned oblique plane illumination (SOPi) microscopy system created through the introduction of a scanning architecture to an oblique plane microscopy (OPM) design in accordance with an illustrative embodiment.

FIG. 6C depicts a volume obtained through affine transformation of stacked data in accordance with an illustrative embodiment.

FIG. 6D is an affine transformed 3D reconstruction obtained using 2P functionality of the SOPi microscopy system in accordance with an illustrative embodiment.

FIG. 8A depicts a portion of the SOPi microscopy system used to conduct rapid volumetric imaging of the zebrafish hindbrain and spinal cord in accordance with an illustrative embodiment.

DETAILED DESCRIPTION

Figure 1B:
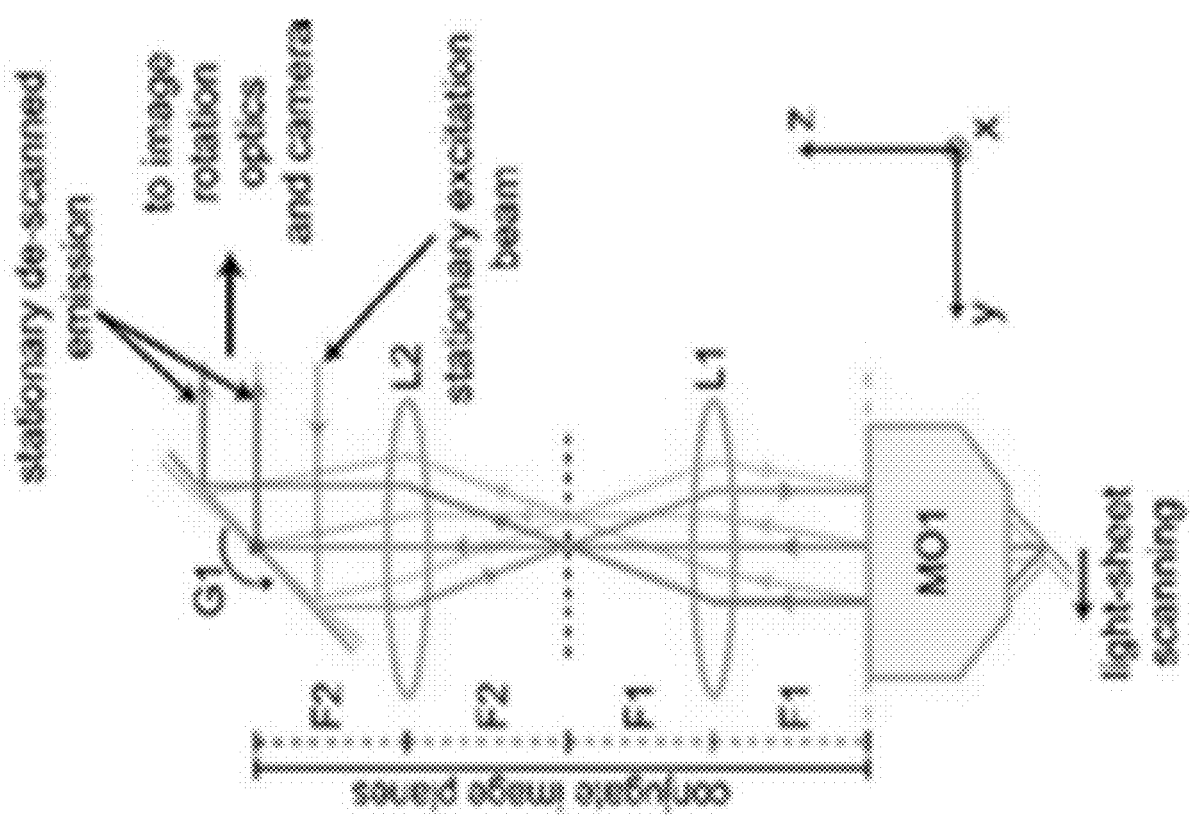
FIG. 1B depicts a modified microscopy system that is formed by introduction of SOPi scanning geometry that is used to obtain scanned oblique plane illumination of an excitation beam in accordance with an illustrative embodiment.

The field of biological imaging is driven by a pressing need for new techniques that offer higher resolution, faster acquisition speed, and deeper imaging capabilities. Modern neuroscience experiments frequently involve in vivo or even whole organism imaging, at optimized speed, depth, and resolution. Steric access is also important such that additional modalities, from electrophysiology to sophisticated virtual reality systems, can be integrated along with an imaging system. One challenge in developing new imaging techniques is overcoming scattering, absorption, and photobleaching that is associated with many biological samples. While super-resolution microscopy approaches such as stimulated emission depletion (STED) microscopy, stochastic optical reconstruction microscopy (STORM), photoactivated localization microscopy (PALM), structured illumination microscopy (SIM), etc. provide the greatest resolution, they compromise on imaging speed, thereby limiting many functional imaging applications. Use of two-photon imaging has become prominent for deep tissue high resolution imaging, yet point scanning approaches suffer from relatively slow imaging speed, especially in volumetric imaging. Light-field microscopy offers the fastest volumetric imaging, limited only by camera frame rate, and some implementations of these techniques have largely overcome the effects of scattering. However, image visualization in light-field microscopy is computationally heavy, and live monitoring of samples at subcellular resolution has not yet been attained.

As discussed above, light-sheet microscopy is a powerful imaging technique that can provide improved resolution, a reduced scattering effect, and high-speed functional imaging capability. The axial resolution of a light-sheet microscope depends on the detection objective numerical aperture (NA) and the light-sheet thickness. Thus, it is possible to attain higher resolution imaging by thinning the imaging light-sheet. While optical sectioning improves axial resolution, it also reduces photobleaching and out-of-focus background signal, circumventing the effects of scattering and improving image contrast.

Several designs of light-sheet microscopes have been developed, including inverted selective plane illumination microscopy (SPIM), OpenSPIM, and multidirectional SPIM. The new advances have also enabled adaptive long-term live sample imaging capabilities. Introduction of a fast scanning mirror into such systems allows for creation of a light-sheet for two-photon excitation of the sample, providing deeper and much higher resolution in scattering samples using light-sheet microscopy, while still maintaining reduced sample bleaching. However, despite many recent developments, light-sheet microscopy remains limited in size and orientation of the imaged sample, due to the steric hindrance associated with designs using two to four objectives to create the light-sheet and image an optically sectioned sample plane. Thus, in vivo imaging of larger organisms remains out of reach for conventional multi-objective light-sheet systems.

One approach to overcome the current constraints on light-sheet microscopy relies on single objective light-sheet microscopy system designs. For example, a single front facing objective based oblique plane microscopy (OPM) can be used, where one high NA objective is used for both illuminating an oblique plane in the sample and imaging it. The OPM system uses three microscope sub-systems arranged sequentially, which helps correct the aberrations introduced by oblique illumination. Additionally, the OPM system employs rotation optics to focus the emission from the illuminated plane on a camera sensor. Rapid volumetric imaging in OPM systems has also been achieved by piezo-assisted scanning of a second objective along an axial direction.

In swept, confocally-aligned planar excitation (SCAPE) microscopy, a polygonal scan mirror is introduced between the first two microscopy sub-systems of an OPM system as an alternative way to achieve rapid scanning. A SCAPE microscopy system simplifies the OPM optical arrangement by moving the excitation beam arrangement from the tight space between two objectives to the larger space between the two tube-lenses, allowing for the more useful lateral rather than axial scan direction of the light-sheet. While OPM and SCAPE systems support rapid volumetric imaging, both are still limited to one-photon light-sheet imaging. Moreover, where OPM systems implement a somewhat inconvenient design to launch and scan the light-sheet into a sample, SCAPE microscopy suffers from scan-position dependent tilt in the light-sheet. This limitation creates a scan-position dependent point spread function (psf) and makes the exact 3D reconstruction of a scanned volume computationally heavy.

A modified form of axial plane optical microscopy, called oblique scanning two-photon light-sheet fluorescence microscopy (OS-2P-LSFM), has been proposed as an approach to overcome scan position dependent tilt in single front facing objective oblique plane light-sheet microscopy. This approach utilizes a refractive glass window as a scanning element to help maintain constant light-sheet sweep angle, but it is limited to a low-tilt angle (nearly axial) light-sheet architecture. In addition, in OS-2P-LSFM systems, heavy beam clipping at the intermediate objective leads to low axial resolution, and the spherical and chromatic aberrations caused by the glass window can become severe constraints beyond small scan ranges. Even the advantage of implementing two-photon light-sheet microscopy is partly compromised due to limited axial resolution of the setup.

In an effort to overcome the aforementioned limitations of existing microscopy systems, described herein is an integrated one- and two-photon scanned oblique plane illumination (SOPi) microscopy system which uses a single front-facing microscope objective to provide light-sheet scanning based rapid volumetric imaging capability at subcellular resolution. Use of a planar scan-mirror based optimized light-sheet architecture allows for non-distorted scanning of volume samples, which simplifies accurate reconstruction of an imaged volume. Use of a single plane mirror based scanning architecture is also simpler than a polygon scan mirror used in SCAPE microscopy and solves the issue of scan position dependent tilt in a generated light-sheet. Integration of both one-photon (1P) and two-photon (2P) light-sheet microscopy in the same system allows for easy selection between rapid volumetric imaging and higher resolution imaging in scattering media.

Using SOPi microscopy, the inventors have demonstrated deep, large volume imaging capability inside scattering neural tissue and rapid imaging speeds up to 10 volumes per second in zebrafish larvae tissue expressing genetically encoded fluorescent proteins such as green fluorescent protein (GFP) and GCaMP6s protein. The flexibility of the SOPi microscopy system and steric access makes it adaptable for numerous imaging applications and broadly compatible with orthogonal techniques for actuating or interrogating neuronal structure and activity.

A key component of the SOPi microscopy system lies in its simple yet optimized optical scanning geometry. FIG. 1A depicts a SOPi microscopy system created through the introduction of a scanning architecture to an OPM design in accordance with an illustrative embodiment. In OPM, a cylindrical lens focuses a laser beam to form a focus line along the y-axis at an offset position to the back focal plane (BFP) of a first microscope objective (MO1), in order to produce oblique light-sheet illumination in the sample volume. This light-sheet is tilted in the y-z plane but remains parallel to the x-axis. The illuminated oblique sample plane is then re-imaged at its conjugate oblique plane in front of a second microscope objective (MO2). This intermediate image plane is then magnified by a third microscope objective (MO3) and a fifth lens (L5) of a microscope to be imaged on a camera. The shared on-axis image location between lenses L1 and L4 allows for insertion of a scanner into this plane, which shifts rays without introducing any additional tilt. To achieve this, the SOPi microscopy system can use a simple scanning geometry that includes two identical lenses (L2, L3) and a galvo scanner based plane mirror (G1), arranged as shown in the inset of FIG. 1A. Since G1 lies in the Fourier plane of both the entry and exit ports, these ports become conjugate image planes to each other by a dual optical Fourier transform operation. As a result, this scanning arrangement can be inserted at the plane marked as 'scanning plane' of the OPM setup without affecting its normal operation.

FIG. 1B depicts a modified microscopy system that is formed by introduction of SOPi scanning geometry that is used to obtain scanned oblique plane illumination of an excitation beam in accordance with an illustrative embodiment. As discussed in more detail below, the scan mirror G1 is used to control light-sheet scanning without a change in tilt while simultaneously de-scanning a fluorescence signal to provide a stationary emission beam. More specifically, the SOPi microscopy system uses G1 to scan the light-sheet along the y-axis without causing any change in its tilt angle (in the y-z plane) and de-scans the generated fluorescence signal to yield a stationary intermediate image of the illuminated plane.

Figure 2C:
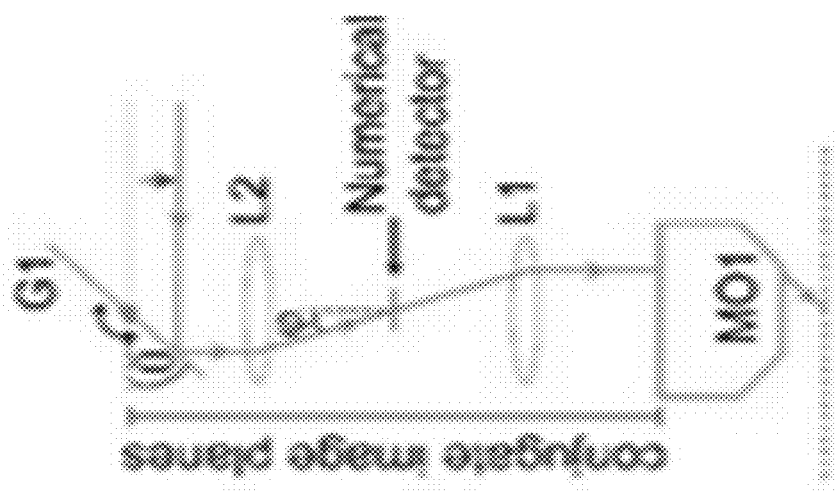
FIG. 2C depicts shifting of the excitation beam from its zero position (shown in FIG. 2A) to produce an oblique light sheet in accordance with an illustrative embodiment.
Figure 2B:
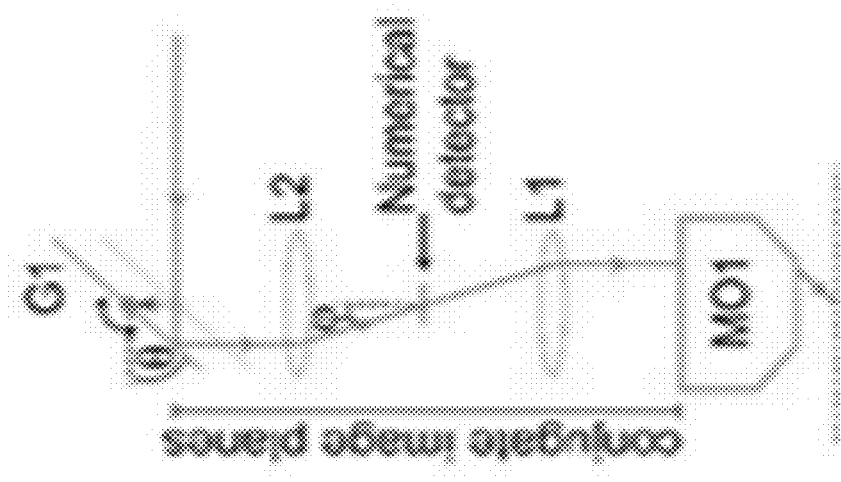
FIG. 2B depicts shifting of the scan mirror to provide an offset in the incident beam to produce an oblique light sheet in accordance with an illustrative embodiment.
Figure 2A:
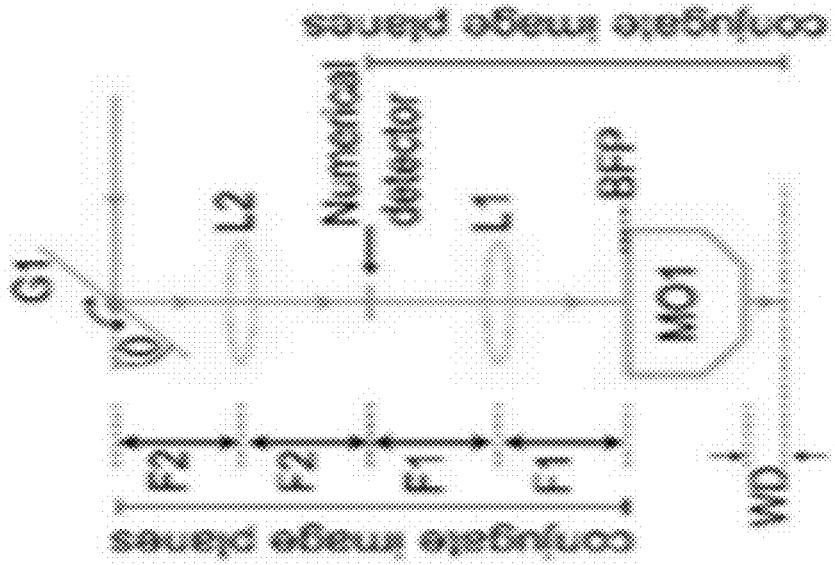
FIG. 2A depicts a scanning architecture with an on-axis excitation beam in accordance with an illustrative embodiment.
Figure 2E:
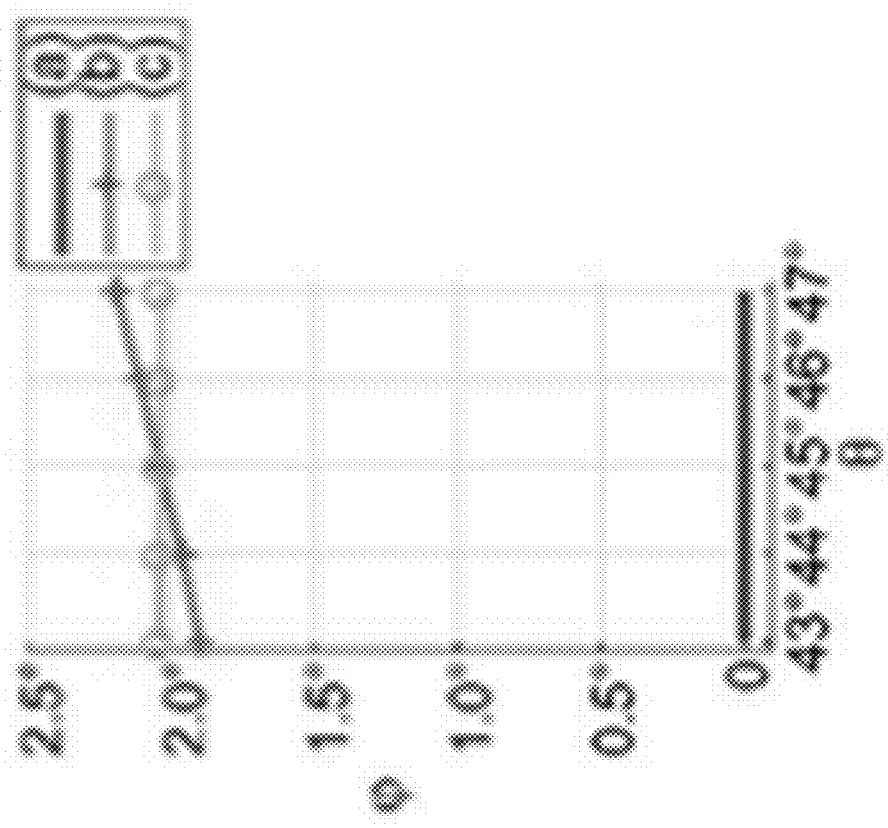
FIG. 2E depicts a numerically measured scanned beam tilt at the detection plane in accordance with an illustrative embodiment.
Figure 2D:
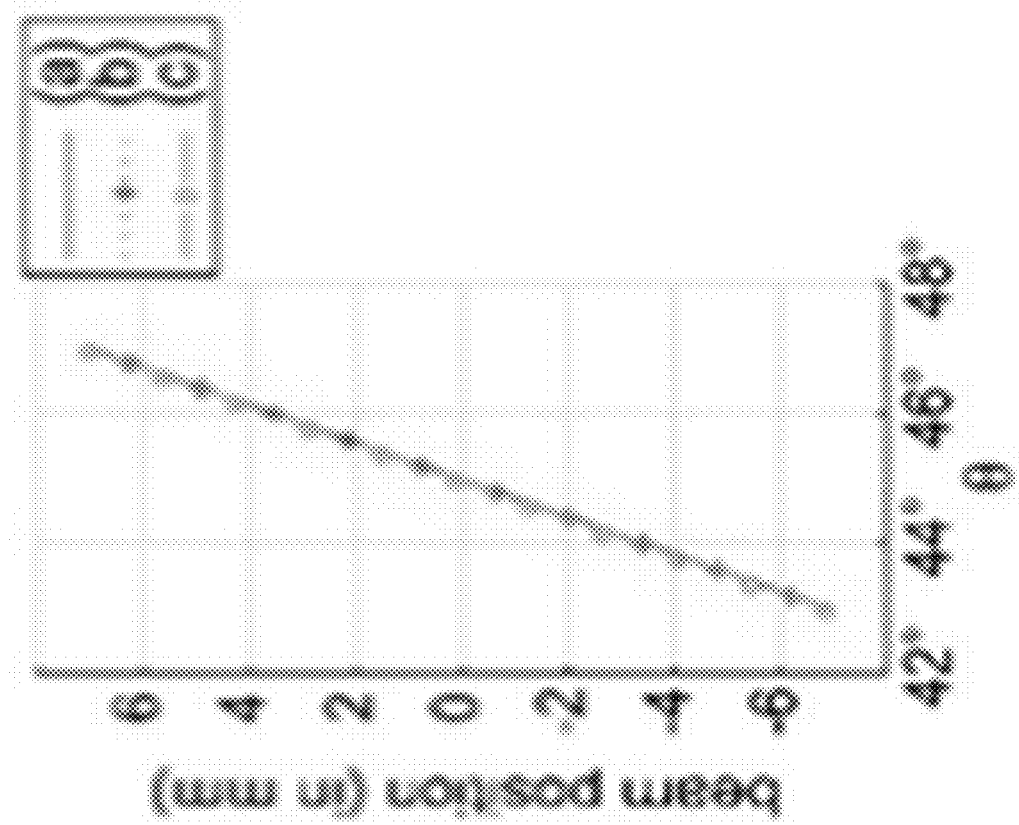
FIG. 2D depicts a numerically measured scanned beam position at a numerical detector plane using ray tracing in accordance with an illustrative embodiment.

FIG. 2A depicts a scanning architecture with an on-axis excitation beam in accordance with an illustrative embodiment. FIG. 2B depicts shifting of the scan mirror to provide an offset in the incident beam to produce an oblique light sheet in accordance with an illustrative embodiment. In FIG. 2B, the point of reflection is centered at the back focal plane of lens L2 and shifts around it as G1 scans. FIG. 2C depicts shifting of the excitation beam from its zero position (shown in FIG. 2A) to produce an oblique light sheet in accordance with an illustrative embodiment. In FIG. 2C, the point of reflection is no longer centered at the back focal plane of L2 and shifts as G1 scans. FIG. 2D depicts a numerically measured scanned beam position at a numerical detector plane using ray tracing in accordance with an illustrative embodiment. FIG. 2E depicts numerically measured scanned beam tilt at the detection plane in accordance with an illustrative embodiment.

Using the principle of Fourier optics, it is known that optical equivalence of the shift theorem assures that a tilt in the back focal plane of a lens becomes a perfect shift without any change in tilt in the front focal plane. It follows that an excitation beam incident at on-axis location in the setup (e.g., as shown in FIG. 2A) with its point of reflection (pivot point) exactly at the back focal plane of L2 undergoes a perfect shift during scanning. However, this arrangement would provide an axial, rather than an oblique, light-sheet. The generation of an oblique light-sheet relies on off-axis incidence of an excitation beam at the back focal plane (BFP) of the microscope objective MO1. This requirement can be met by either shifting G1 or the excitation beam itself as shown in FIGS. 2B and 2C, respectively. While shifting G1 perturbs the conjugate plane relationship between entry and exit ports of the scanning arrangement (e.g., the inset of FIG. 1A), shifting the excitation beam causes the pivot point to move away from the back focal plane of L2. Either condition could deteriorate scanning/de-scanning performance of the system. Given that the amount of offset is on the order of a few millimeters (mm) and is a fraction of the focal length of L2 (e.g., 100 mm), it follows that shifting G1 to incur the desired offset as in FIG. 2B may be effective because it maintains the pivot point of the excitation beam at the back focal plane of L2. Then subsequent optics can be slightly adjusted to compensate for the change in location of the exit port in the scanning arrangement. To validate this reasoning, the inventors performed ray tracing based optical modeling of all three arrangements shown in FIGS. 2A-2C.

It is sufficient, in theory, to simulate the scanning of a thin excitation beam which lies in the plane of the diagram. Once the behavior of this beam is established, it can be generalized to other beams within the light-sheet. This is possible because the scan mirror G1 is based on a single axis galvanometer, and its rotation along the x-axis affects the component of rays lying in the plane of rotation alone (y-z plane). A simulation was performed using lens L2 (e.g., an achromatic doublet lens, f=100 mm), a scan mirror, a numerical plane detector, and 3.54 mm for the numerical value of the shift in G1 position/beam-offset as per FIGS. 2A-2C. The calculation of 3.54 mm as the optimal offset for this configuration is explained in more detail below. In the simulation, the beam-position and beam-tilt angle ($\varphi$) were recorded at the detector plane for G1 scan angle ($\theta$) in the range of 43°-47° and plotted in FIGS. 2D and 2E. In an alternative embodiment, an alternative detection architecture may be used such as a phase mask based extended depth of field approach.

While the position of the beam does not change among the three scan geometries (owing to small scan angle and small offset relative to the focal length of the lens), the tilt angle is highly sensitive to the choice. Conversely, the arrangement based on an offset of the beam as shown in FIG. 2C shows a constant tilt during the beam scanning process, and hence it is the optimal way to introduce the offset. This result dramatically simplifies the experimental setup of a SOPi microscopy system, as it can be arranged by aligning all the optical elements (including the galvonometer scanner) between MO1 and MO2 along a common optical-axis and then introducing the desired offset in the incoming excitation beam. This result also describes why a scanning arrangement employing a polygon mirror, which can only favor the scanning geometry of FIG. 2B, is a suboptimal choice when aiming for constant tilt scanning.

Figure 3A:
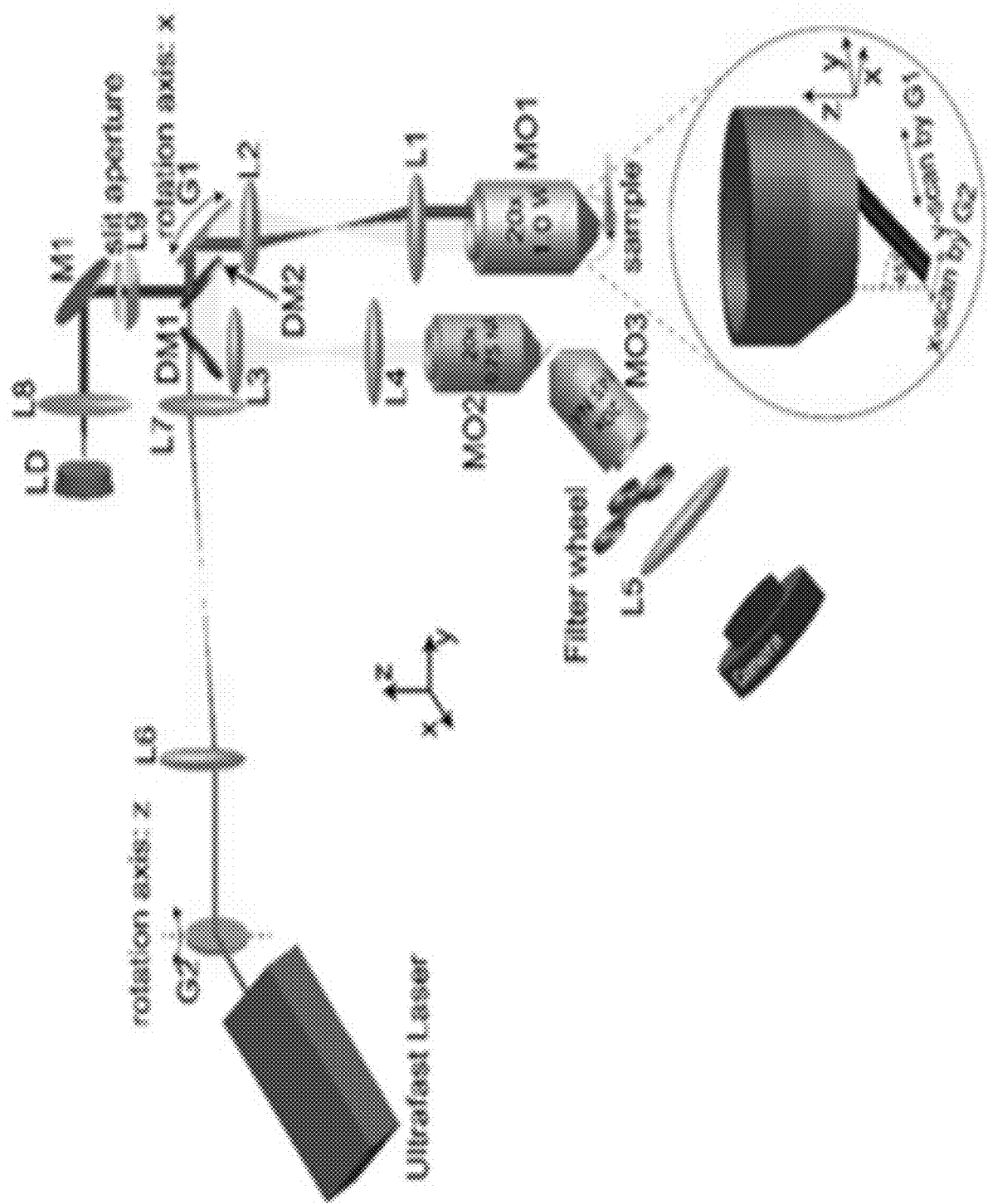
FIG. 3A depicts an integrated SOPi microscopy system that includes two excitation sources in accordance with an illustrative embodiment.

FIG. 3A depicts an integrated SOPi microscopy system that includes two excitation sources in accordance with an illustrative embodiment. The inset of FIG. 3A depicts the scanning arrangement used to create and sweep a light sheet in a sample volume. In FIG. 3A, MO refers to a microscope objective, DM refers to a dichroic mirror, LD refers to a laser diode, and M refers to a mirror. For 1P excitation, a low-cost laser diode (e.g., $\lambda$=462 nm) driven by a commercial benchtop variable power supply is used. For two-photon excitation, a tunable ultrafast laser (e.g., 680-1300 nm) was used. The laser diode emission was collimated by passing it through an achromatic doublet lens (L8, f=50 mm). This collimated beam was then passed through a slit-aperture and a plano-convex cylindrical lens (L9, f=50 mm) to focus the beam to a line. Reflection from a dichroic mirror (DM2, 470 nm single-edge long-pass) allows the beam to be focused on a galvanometer mounted planar silver mirror (G1, QS-12, 10 mm clear aperture), which is connected to a driver board. The line focus orientation was perpendicular to the galvanometer's axis of rotation, and the origin position of the scan mirror was set at 45° to the incoming beam. Along the reflected path from the scan mirror, an imaging setup including two achromatic doublet lenses (L2, f=200 mm & L1, f=100 mm) was used to re-image this focused line onto the back-focal plane of the main microscope objective (MO1, 20×, 1.0 W). In alternative embodiments, different configurations may be used.

The main microscope objective MO1 performs a Fourier transform of the beam to produce a light-sheet in the sample volume. As expected from the Fourier transform properties, the light-sheet orientation is perpendicular to the line-shaped focus at the back-focal plane of the objective. Then, rotation of the scan mirror gives rise to pure translation of the light-sheet in front of the objective with no change in the tilt angle. The same main objective collects the fluorescence signal from the sample, which follows the path of the excitation beam backwards to get reflected off the scan mirror. A dichroic mirror (DM1, 640 nm single-edge, long-pass) was used to reflect the emitted fluorescent signal to another two-lens relay system that includes achromatic doublet lenses (L3, f=100 mm & L4, f=150 mm) which image the center of the scan mirror onto the back-focal plane of a dry super-achromatic microscope objective (MO2, 20×, NA 0.75). This arrangement sets the working distance of the two objectives (MO1 and MO2 in FIG. 3A) as conjugate image planes of one another. Moreover, the choice of MO1-L1, L2-L3 and MO2-L4 is made in such a way that the intermediate image plane has the same lateral and axial magnification. In alternative embodiments, different lenses, mirrors, and/or microscope objectives may be used.

In an illustrative embodiment, the same galvanometer-mounted mirror (G1) responsible for scanning the light-sheet also de-scans the fluorescence signal to provide a stationary intermediate image. An offset (3.54 mm as calculated below) was introduced in the incoming excitation beam by shifting the laser-diode, collimating lens (L8), and the slit-aperture arrangement so that the line-shaped focused beam at the back-focal plane of the objective falls at an off-axis position to give rise to a 45° tilted light-sheet in the sample volume. This arrangement produces an intermediate 45° tilted image plane of the oblique light-sheet illuminated sample in front of the dry objective (MO2). A third microscope objective (MO3, 20×, NA 0.45) is used along with an achromatic doublet lens (L5, f=100 mm) and a scientific complementary metal-oxide semiconductor (sCMOS) camera to form a magnified image of this intermediate oblique image plane on the camera. The third objective MO3 is oriented at 45° with respect to the principal axis of the second objective as shown in FIG. 3A such that the intermediate image plane is located exactly at the working distance of the third microscope objective. For this precise positioning, a fine adjustment manual translation stage was used to move the third microscope objective MO3 in the position to enable accurate imaging of the oblique intermediate image plane on the stationary camera. In this setup, rotation of the scan mirror enables scanning in a sample volume, and the scanned oblique plane always remains in focus on the camera. In the proposed configuration, a 45° tilted light-sheet was chosen as this angle is a good compromise between axial and lateral orientation of the light-sheet. While axial orientation may be optimal in terms of penetration depth of the excitation light-sheet, the fluorescence emission from such a plane cannot be collected without heavy compromise on the resolution. On the other hand, near lateral orientation of light-sheet can be obtained by using a very high numerical aperture (NA) oil immersion objective, however such an orientation of the light-sheet, even while imaging at shallow depth, covers a great distance through a scattering sample and thus gives rise to non-uniform fluorescence excitation. Such high NA objectives of the oil immersion type are not suitable for imaging live biological samples, but for many other samples an alternative embodiment of the system may be used with such a high NA objective and a tilt angle anywhere between near axial position 0° to 80°.

In an illustrative embodiment, the 2P light-sheet imaging capability included in the system has properties similar to digital scanned laser light-sheet fluorescence microscopy (DSLM). To maintain a small illumination numerical aperture and therefore a large Rayleigh range, the laser beam was not expanded. Rather, the ultrafast laser beam is reflected with a galvanometer-mounted plane mirror G2 to produce a light-sheet by fast scanning. A relay setup including two identical achromatic lenses (L6, L7 f=100 mm) was used to image scan mirror G2 onto another scan mirror G1, which is responsible for scanning the light-sheet as described above. The two-photon beam scanning galvanometer G2 is oriented so that its rotation axis is orthogonal to the rotation axis of galvanometer G1 as shown in FIG. 3A.

Additionally, the same offset (i.e., 3.54 mm) was introduced to the laser beam forcing the 2P light-sheet to undergo a 45° tilt in front of the main objective, co-aligning with the 1P light-sheet orientation. During imaging experiments, both galvonometer scanners were controlled by a custom graphic user interface (GUI). This GUI, in conjunction with a processor, generates a ramp voltage signal output, with the help of a data acquisition card (DAQ) having 2 analog output channels. Using the GUI, a user is able to control the amplitude and frequency of the ramp signals, which directly translates into mirror scan range and scanning speed, respectively. The relationship between applied voltage from the DAQ, tilt-angle of scan mirrors, and the actual physical sweep distance moved by the light-sheet in the sample volume for both galvanometers in the setup was evaluated. The corresponding scaling factors were used to enable the selection of scanning distance (in μm) and scanning time/frequency (in seconds/Hz) directly from the GUI. For camera control and image acquisition, an open source microscopy control software was used. The scanning speed of the light-sheet and camera acquisition frame-rate determine voxel depth. Numerically, voxel depth is obtained from a single sweep of the scanned volume by taking a ratio of scan-range (in μm) and the total number of frames. For example, scanning a 500 μm range of a sample in 10 seconds at 50 fps camera speed yields voxel depth=scan-range÷number of camera frames=500 μm÷500=1 μm.

Included below are example calculations for determining the above-discussed offset that is used to generate the desired oblique light-sheet. Generation of an oblique light-sheet is based on the Fourier transforming property of the optical lens. Additionally, the numerical aperture of the lens (water immersion objective MO1) limits the attainable tilt to a maximum value of $\sin^{-1}(1/1.33)=48.75°$. To avoid clipping the beam at the edge of the aperture, a target tilt angle was set to a slightly smaller value of 45°. The required offset to get this desired 45° oblique light-sheet is readily calculated. In one embodiment, the L1-MO1 combination shown in FIG. 2C forms a microscope with lateral or angular magnification of 20×200/180=200/9. Thus, a beam travelling from the numerical detector plane to the sample plane in front of MO1 is de-magnified in its spatial position, and magnified in its angular tilt by the same factor of 200/9. For a 45° tilt in the sample plane, this requires the beam tilt at the numerical detector plane to be 45°×9/200=2.025°. Given the focal length of L2 (f=100 mm), the required offset of the incident beam is calculated as beam-offset=focal length×tan (angular tilt)=100 mm×tan(2.025°)≈3.54 mm. In alternative embodiments, a different focal length and/or angular tilt may be used, and a new value for the required offset of the incident beam may be calculated using the process outlined above.

Figure 3B:
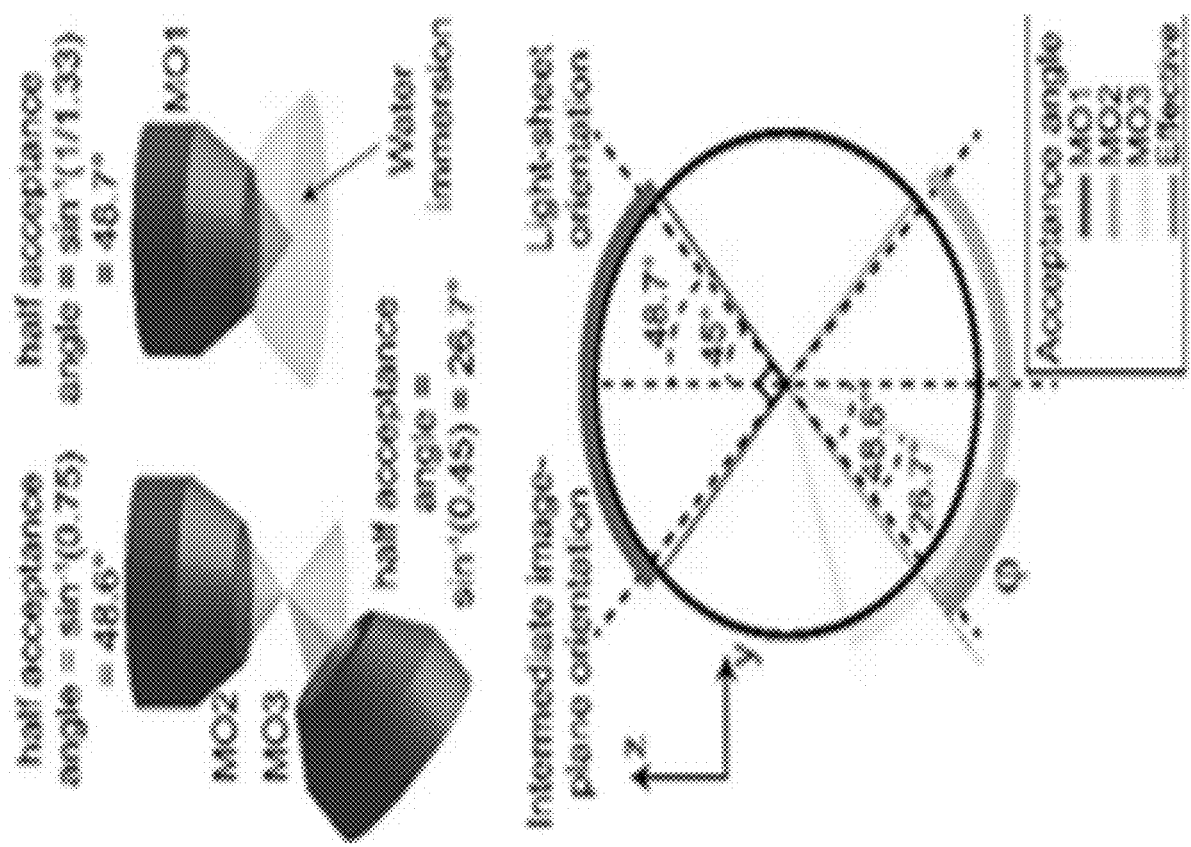
FIG. 3B depicts calculation of an effective acceptance angle for a SOPi microscopy system in accordance with an illustrative embodiment.

One of the main drawbacks of placing three objectives sequentially is the limit on the effective numerical aperture of the overall system. The effective numerical aperture is obtained from the maximum cone angle that the system can effectively gather light from and deliver to an image-forming element such as a camera. FIG. 3B depicts calculation of an effective acceptance angle for a SOPi microscopy system in accordance with an illustrative embodiment. It can be seen from FIG. 3B that the third objective in the SOPi microscopy system becomes the main limiting factor in defining the overall numerical aperture of the system. The total effective acceptance angle of the depicted SOPi microscopy system is $\varphi=48.6°-90°/2+26.7°=30.2°$. Hence, the effective numerical aperture=$n_{water} \times \sin(\varphi/2)=1.33 \times \sin(30.2°/2) \approx 0.34$. The effective magnification of the SOPi microscopy system can also be calculated as the product of three individual magnifications of constituent microscope sub-systems (MO1-L1, L4-MO2 and MO3-L5). In one embodiment, M1=20×200/180, M2=1÷(20×150/180) and M3=20×100/180. Hence, M=M1×M2×M3=200/150×20×100/180=400/27 14.81. With a camera pixel size of 11 μm×11 μm it is straightforward to determine the effective voxel width and height in an image space as follows: Voxel width=voxel height=11 μm÷14.81≈0.74 μm. In alternative embodiments, a different camera pixel size and/or different choice of lenses may be used.

Figure 4A:
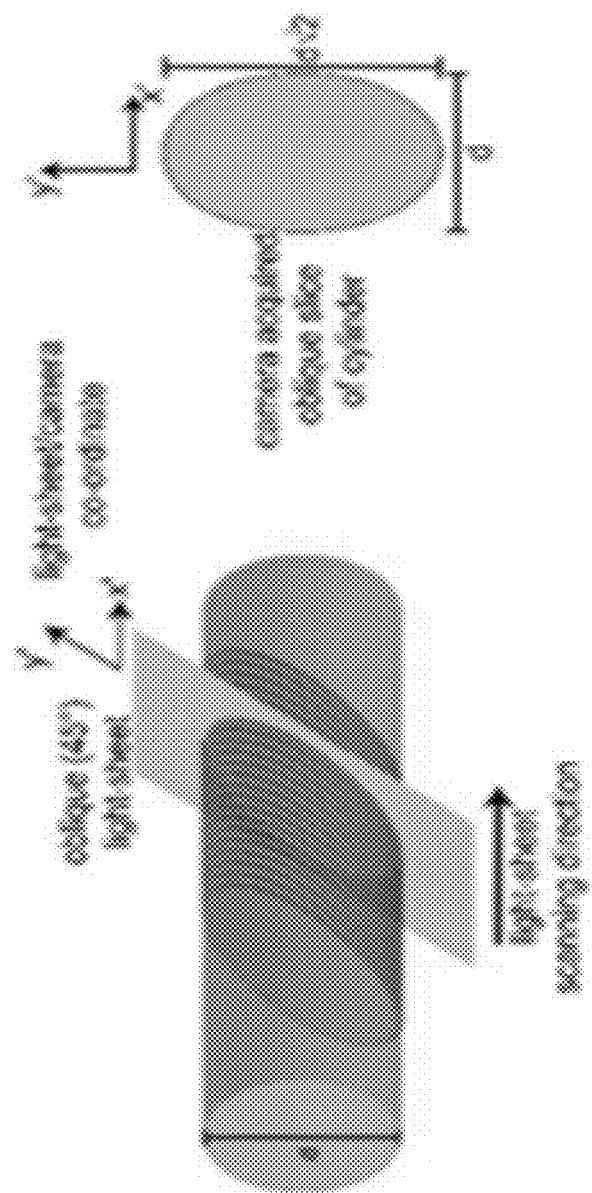
FIG. 4A depicts light-sheet orientation in a cylindrical object and a corresponding image section acquired by a camera in accordance with an illustrative embodiment.
Figure 4B:
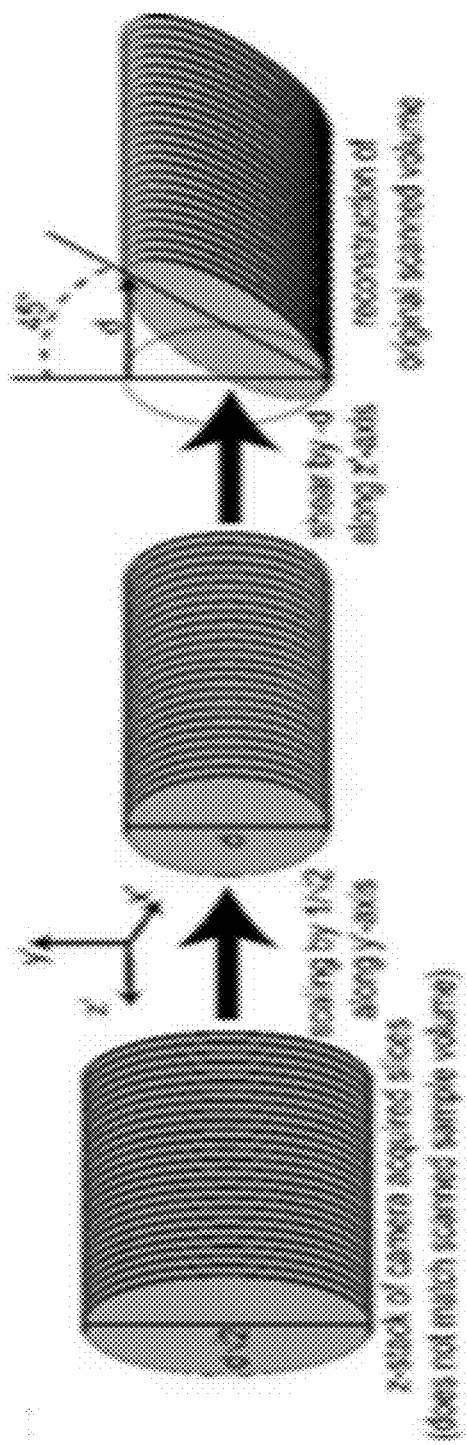
FIG. 4B depicts geometrical transformations to reconstruct a scanned volume in accordance with an illustrative embodiment.

As discussed above, the proposed SOPi microscopy system utilizes a unique scanning geometry where a 45° oblique illumination plane is scanned along the perpendicular direction to the optical axis of the microscope objective. As described with reference to FIGS. 4A and 4B, the volume acquired in this geometry cannot be reconstructed by simply stacking the acquired images. FIG. 4A depicts light-sheet orientation in a cylindrical object and a corresponding image section acquired by a camera in accordance with an illustrative embodiment. FIG. 4B depicts geometrical transformations to reconstruct a scanned volume in accordance with an illustrative embodiment.

Reconstruction of a scanned volume depends on combining two geometrical transformations (scaling and shearing) together. A geometrical transformation operation (in 3D Cartesian co-ordinates) is described by the following matrix operation:

Matrix 1:

$$\begin{bmatrix} x \\ y \\ z \\ 1 \end{bmatrix} = \begin{bmatrix} a_{xx} & a_{xy} & a_{xz} & a_{xt} \\ a_{yx} & a_{yy} & a_{yz} & a_{yt} \\ a_{zx} & a_{zy} & a_{zz} & a_{zt} \\ 0 & 0 & 0 & 1 \end{bmatrix} \cdot \begin{bmatrix} x_i \\ y_i \\ z_i \\ 1 \end{bmatrix}$$

The scaling matrix can be defined as:
Matrix 2:

$$M_{sc} = \begin{bmatrix} 1 & 0 & 0 & 0 \\ 0 & 1/\sqrt{2} & 0 & 0 \\ 0 & 0 & 1 & 0 \\ 0 & 0 & 0 & 1 \end{bmatrix}.$$

The shearing matrix can be defined by:
Matrix 3:

$$M_{sh} = \begin{bmatrix} 1 & 0 & 0 & 0 \\ 0 & 1 & 0 & 0 \\ 0 & -1 & 1 & 0 \\ 0 & 0 & 0 & 1 \end{bmatrix}$$

Therefore, the combined affine transform matrix can be given by:
Matrix 4:

$$M_{sh} \times M_{sc} = \begin{bmatrix} 1 & 0 & 0 & 0 \\ 0 & 1/\sqrt{2} & 0 & 0 \\ 0 & -1\sqrt{2} & 1 & 0 \\ 0 & 0 & 0 & 1 \end{bmatrix}$$

This affine transformation matrix is used in conjunction with software to perform three dimensional geometrical transformation of the acquired image data such that accurate three-dimensional volume reconstruction can be obtained.

Figure 5A:
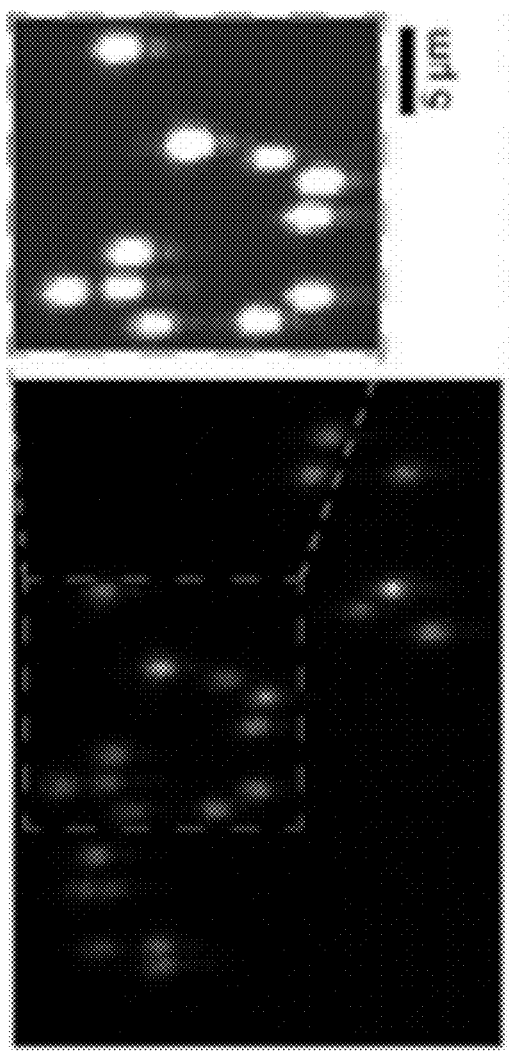
FIG. 5A is a maximum intensity projection view of microbeads imaged using 1P functionality of the SOPi microscopy system in accordance with an illustrative embodiment.
Figure 5B:
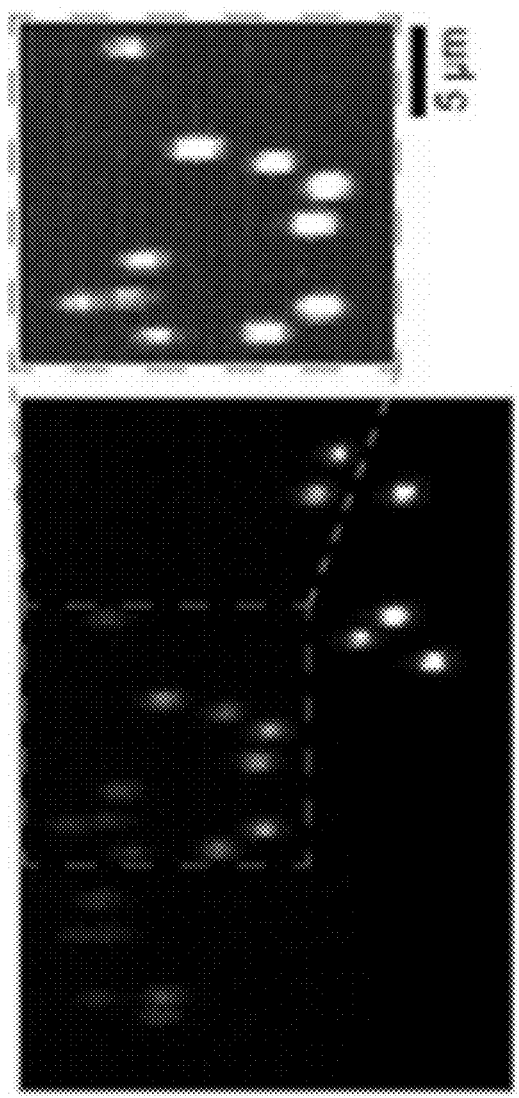
FIG. 5B is a maximum intensity projection view of microbeads imaged using 2P functionality of the SOPi microscopy system in accordance with an illustrative embodiment.
Figure 5C:
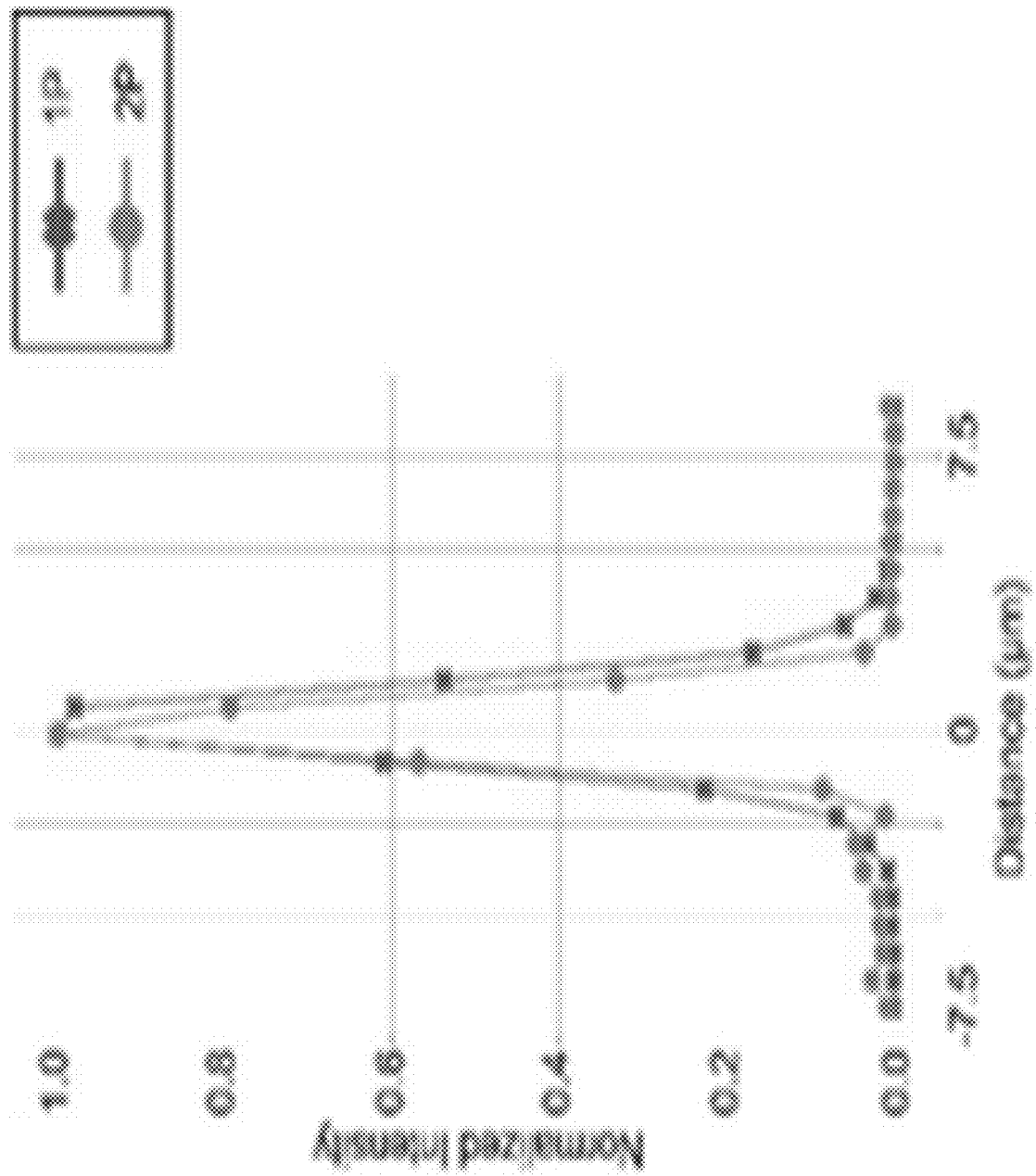
FIG. 5C depicts a normalized intensity line-plot through one of the sampled beads in accordance with an illustrative embodiment.

Included below is a discussion of system tests performed using the embodiments of FIGS. 1-4. In an effort to determine the effectiveness of the SOPi microscopy systems described herein, several tissue sampling tests were performed. In one test, microbeads embedded into agar gel were used for evaluating the imaging performance of the SOPi microscopy system. A 0.5 weight % solution of agarose was prepared in Milli-Q water. Then, a 1 μL solution of 0.5 μm fluorescent microspheres was added to 20 mL of the agarose solution. The mix was vortexed, heated, and then cooled in a petri dish to form a volume sample. FIG. 5A is a maximum intensity projection view of microbeads imaged using 1P functionality of the SOPi microscopy system in accordance with an illustrative embodiment. FIG. 5B is a maximum intensity projection view of microbeads imaged using 2P functionality of the SOPi microscopy system in accordance with an illustrative embodiment. The insets in FIGS. 5A and 5B display enhanced images to illustrate the extended tail of the point spread function (PSF) for the 1P sampling that arises due to some residual system aberration and the thicker light-sheet. FIG. 5C depicts a normalized intensity line-plot through one of the sampled beads in accordance with an illustrative embodiment. FIG. 5C demonstrates the superior resolution capability of the 2P functionality of the SOPi microscopy system. To determine the resolution capability of SOPi, the full width at half maxima (FWHM) of seven microbeads was measured using software, and it was determined that the 1P FWHM is 1.30 μm (standard deviation 0.09 μm) and the 2P FWHM is 1.16 μm (standard deviation 0.06 μm).

As another test example, a transgenic mouse hippocampus was imaged using the SOPi microscopy system. Specifically, young adult male Thy1-GFP mice (postnatal day ~40) were used for this testing. Mice were housed under a 12 hour light-dark cycle, with food and water available ad libitum. For preparing brain slices, mice were deeply anaesthetized with isoflurane and transcardially perfused with 4% paraformaldehyde (PFA) in 0.1 M phosphate buffered saline (PBS). Brains were post-fixed for 2-5 days at −4° C., prior to sectioning. For thick brain slice imaging, tissue containing the hippocampus was sectioned coronally at 1000 μm on a Vibratome mounted onto slides, and coverslipped under a glycerol:Tris buffered saline (3:1).

Figure 6B:
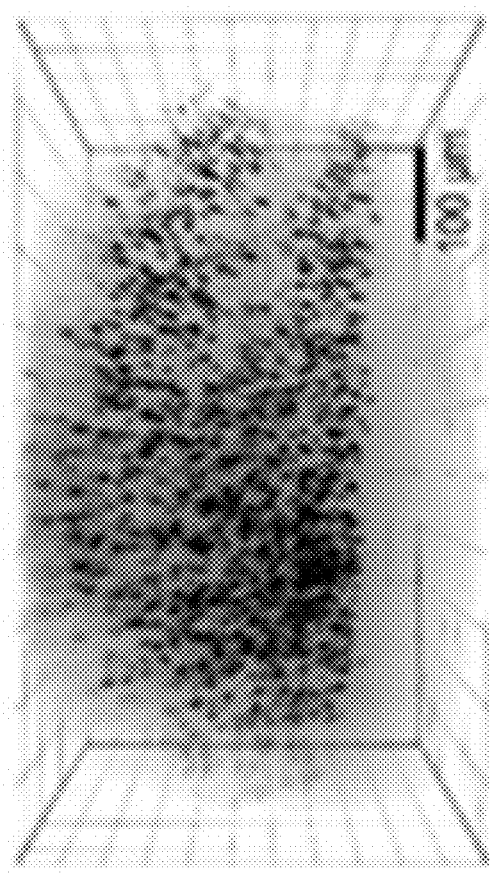
FIG. 6B depicts a volumetric reconstruction of the test sample obtained by z-stacking frames of 1P light-sheet images obtained using the SOPi microscopy system in accordance with an illustrative embodiment.
Figure 6A:
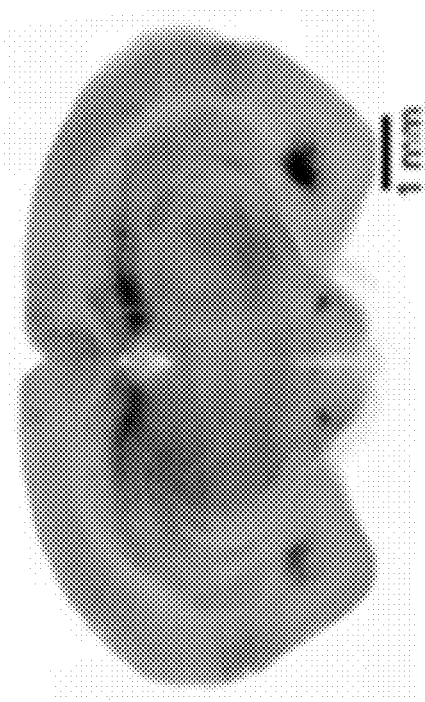
FIG. 6A is a wide field fluorescent image of a 1 mm thick slice of thy1GFP of an adult mouse in accordance with an illustrative embodiment.

FIG. 6A is a wide field fluorescent image of a 1 mm thick slice of thy1GFP of an adult mouse in accordance with an illustrative embodiment. In FIG. 6A, the highlighted area represents the hippocampus imaged using the SOPi microscopy system. A laser diode assisted 1P SOPi microscopy system was used to acquire a sequence of 600 images in 6 seconds at 10 ms exposure time through a 850×325×500 μm$^3$ volume within the sample. A 3D reconstruction of the volume was then obtained by z-stacking all acquired frames and visualizing with software. FIG. 6B depicts a volumetric reconstruction of the test sample obtained by z-stacking frames of 1P light-sheet images obtained using the SOPi microscopy system in accordance with an illustrative embodiment.

As expected, z-stacking the acquired frames produced a geometrically distorted 3D reconstruction of the original volume. To correct this distortion, an affine transformation was applied to the stacked data using transformation software. FIG. 6C depicts a volume obtained through affine transformation of stacked data in accordance with an illustrative embodiment. FIG. 6C shows true 3D perspective of the scanned volume (i.e., it matches the view of the dentate gyrus as expected from FIG. 6A) such that neurons and their dendrites can be easily tracked throughout the scanned volume in the slice. The inset of FIG. 6C illustrates fine dendritic details of dentate gyrus granule neurons.

To perform 2P light-sheet imaging, an ultrafast laser of the SOPi microscopy system was tuned to 910 nm. The laser power was adjusted to obtain well exposed images at a 50 ms exposure time while minimizing bleaching. Additionally, the light-sheet scanning mirror range and speed were adjusted to obtain 600 frames to scan through 750×270×500 $\mu m^3$ volume in 30 seconds. Repeating the same process of stacking frames followed by affine transformation, a volume reconstruction was obtained. FIG. 6D is an affine transformed 3D reconstruction obtained using 2P functionality of the SOPi microscopy system in accordance with an illustrative embodiment. The inset of FIG. 6D demonstrates the superior dendritic imaging as compared to the image (FIG. 6C) obtained using 1P functionality. The two arrows in each of FIGS. 6C and 6D facilitate direct comparison of the same dendritic region for both 1P and 2P imaging. Thus, as expected, the 2P light-sheet imaging has superior structural imaging capability that comes at the cost of speed, as the 2P fluorescence cross section is much smaller than 1P fluorescence cross section for illumination by a low numerical aperture excitation beam.

Another test of the SOPi microscopy system involved both functional and structural imaging of live and behaving zebrafish larvae. Fish were raised and maintained at 28.5° C. in a breeding facility. For imaging zebrafish (*Danio rerio*), experiments were performed in 5-7-day-post-fertilization (dpf) zebrafish larvae. At this age, fish are freely swimming. For structural imaging of neurons, 5 dpf nacre Tg(Olig2:GFP) larvae were used. For calcium imaging experiments, 5-7 dpf Tg(VGlut2a:Gal4;UAS:GCamP6s) zebrafish larvae were used. These were bathed in 0.003% 1-Phenyl-2-thiourea (PTU) starting at 18 hours post fertilization, to prevent the formation of melanophores. For all experiments, larvae were first anesthetized in a 0.02% solution of tricaine methanesulfonate (MS-222) and then immersed in 1 mg/ml α-bungarotoxin for 2-3 minutes to prevent muscle activation and movement artifacts. The larvae were then embedded in 1.4% low melting point agarose (Invitrogen) in a glass bottomed Petri dish and then covered in anesthetic-free 10% Hank's solution.

Figure 7B:
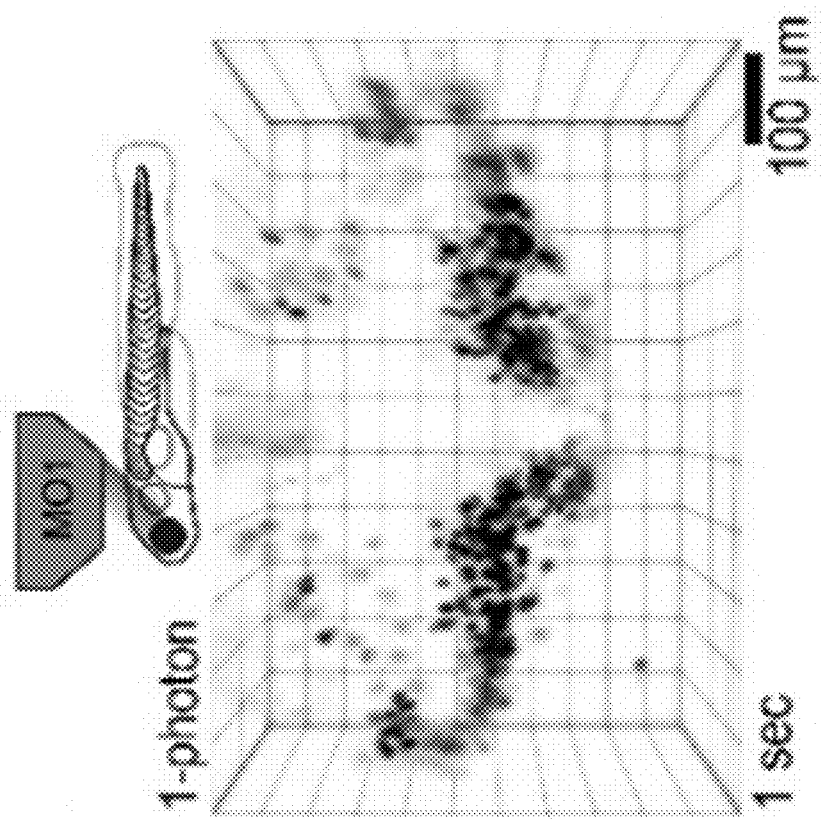
FIG. 7B depicts an image obtained using 1P functionality of the SOPi microscopy system to scan the zebrafish cerebellum in accordance with an illustrative embodiment.
Figure 7A:
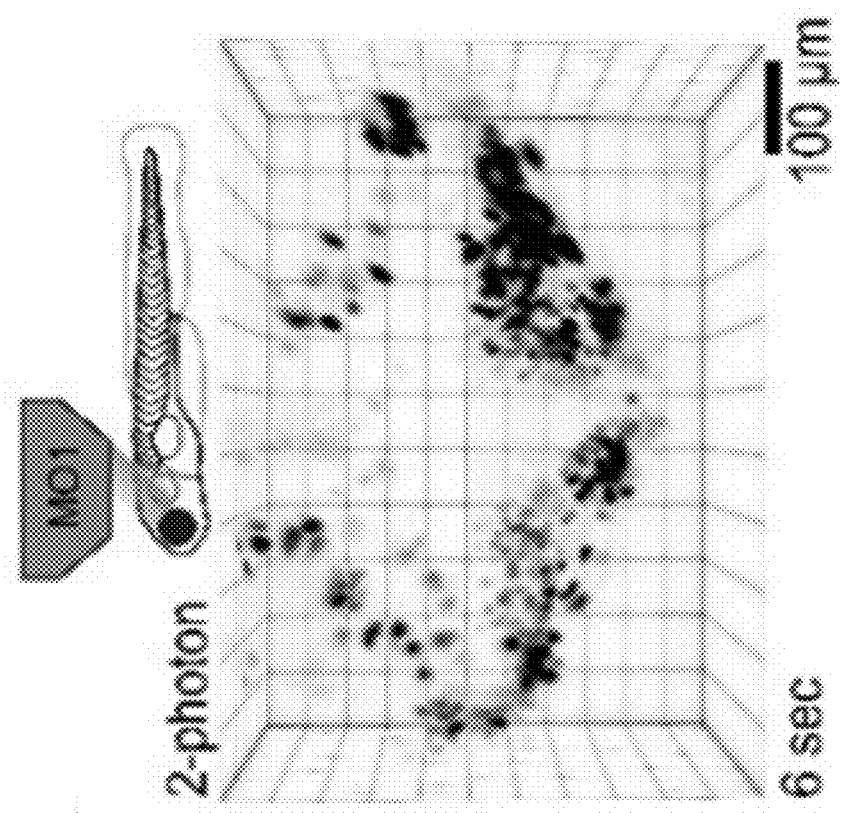
FIG. 7A depicts an image obtained using 2P functionality of the SOPi microscopy system to scan a zebrafish cerebellum in accordance with an illustrative embodiment.
Figure 7C:
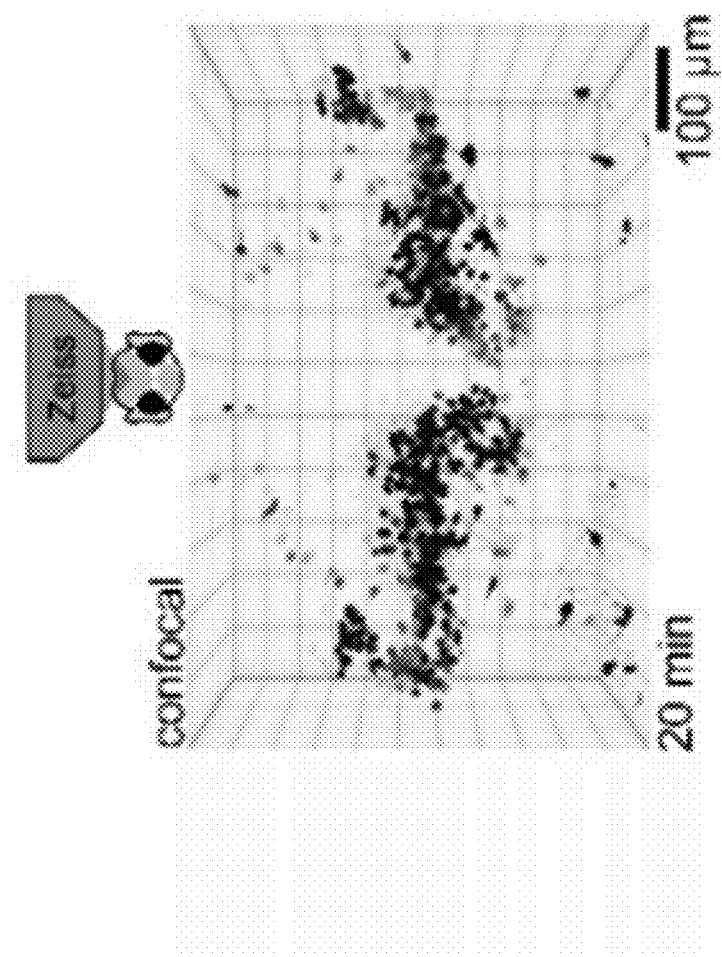
FIG. 7C depicts a high resolution confocal image of the zebrafish cerebellum obtained using the confocal microscope in accordance with an illustrative embodiment.

For structural imaging, the densely labelled cerebellum region of a GFP expressing fish brain (5-day-post-fertilization nacre Tg(Olig2:GFP) larvae) was targeted. A scanned region of 450×300×200 $\mu m^3$ was sufficient to contain the entire cerebellum. Even with slow high resolution scanning, it took only 6 seconds and 1 second to image this volume with 2P and 1P light-sheets, respectively. Using a 1P light-sheet, with modest compromise on resolution along the scan direction, same volume was able to be imaged in $\frac{1}{10}^{th}$ of a second. The captured frames were stacked followed by affine transformation to get the 3D volume reconstruction of the scanned volume, as shown in FIGS. 7A and 7B. Specifically, FIG. 7A depicts an image obtained using 2P functionality of the SOPi microscopy system to scan a zebrafish cerebellum in accordance with an illustrative embodiment. FIG. 7B depicts an image obtained using 1P functionality of the SOPi microscopy system to scan the zebrafish cerebellum in accordance with an illustrative embodiment. To compare the imaging quality of the SOPi microscopy system with conventional imaging modalities, the same volume in the same fish was also scanned on a Zeiss LSM 710 confocal microscope (~20 minutes) and reconstructed as a 3D volume. FIG. 7C depicts a high resolution confocal image of the zebrafish cerebellum obtained using the confocal microscope in accordance with an illustrative embodiment. Comparing the reconstructions illustrates that the SOPi microscopy system can image most of the cell bodies, even when they are densely packed together, in a small fraction of time compared to point-scanning confocal imaging.

Figure 8B:
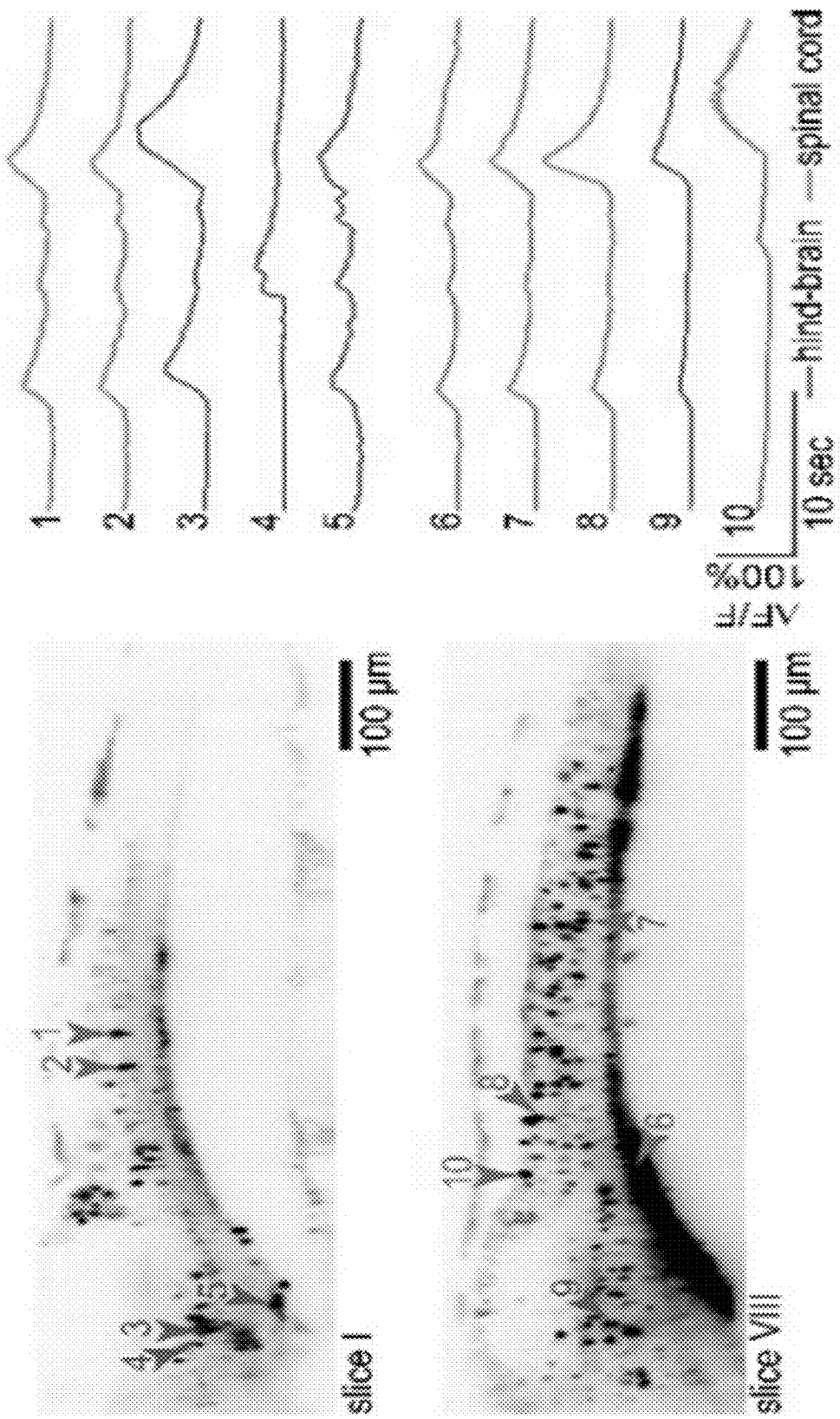
FIG. 8B depicts GCaMP fluorescence in a subset of active cells during spontaneous activity as standard deviation based intensity projections of the frames corresponding to slice position I and VIII in scanned volume in accordance with an illustrative embodiment.

In another test involving the zebrafish larvae, rapid volumetric calcium imaging was performed on a 5-day-post-fertilization GCaMP6s-expressing zebrafish larvae (Tg (VGlut2a:Gal4;UAS:GCaMP6s). For this test, a 1P light-sheet from the SOPi microscopy system was used to image a volume section covering the hind brain and spinal cord of fish spanning 850×300×50 $\mu m^3$. In this volume section, GCaMP6s-expressing neurons were imaged during spontaneous activity in immobilized larvae for 30 seconds at a rate of 10 volumes per second and a capture rate of 100 frames per second using a 9 ms exposure time on the camera. FIG. 8A depicts a portion of the SOPi microscopy system used to conduct rapid volumetric imaging of the zebrafish hindbrain and spinal cord in accordance with an illustrative embodiment. The scan direction of 50 µm was optically sub-divided into 10 segments, such that each segment was imaged at a constant 10 frames per second for the duration of recording. FIG. 8B depicts GCaMP fluorescence in a subset of active cells during spontaneous activity as standard deviation based intensity projections of the frames corresponding to slice position I and VIII in scanned volume in accordance with an illustrative embodiment. Out of a few hundred active neurons observed in the scanned volume, the calcium influx response over time was plotted as ΔF/F for 10 selected cells, as depicted in the right portion of FIG. 8B. The 4D (3D volume+time) rendering of this imagery was conducted at a rapid 10 volumes per second.

Described below are additional embodiments of single-objective based light-sheet microscopy, and a discussion of how the system can be extended to image much larger samples through multiple tile volume acquisitions. This is enabled by SOPi's tilt-invariant scanning geometry. Also described below is a processing pipeline that can be used to provide examples of stitched SOPi acquired volume-tiles, along with techniques to obtain true perspective 3D visualization in stitched datasets. Towards the goal of attaining large volume imaging capability, a modified 1p-SOPi system is able to image deeper in scattering media.

As discussed above, the 1p-SOPi has lower resolution and shadow streak artifacts when compared to its 2p counterpart. In addition to a larger point-spread-function of 1p fluorescence excitation, there are several limitations on imaging performance in the above-discussed 1p-SOPi implementation. First, the use of a multimode, high divergence excitation source (laser diode) can lead to broadening of the light-sheet thickness, causing poorer optical sectioning. Second, like earlier attempts for this class of imaging techniques, the 1p light-sheet for the SOPi system was created by making use of a slit aperture and cylindrical lens in the illumination arm. From conventional LSFM approaches, it is known that such an approach can lead to shadow streaks and degrade optical sectioning. In an alternative approach, a fast galvo scanner and a converging lens can be used to facilitate rapid movement of a micrometer thin beam of laser to generate the light-sheet and provide uniform illumination at improved power efficiency with better optical sectioning. This is due to reduced aberrations within the beam.

Figure 9A:
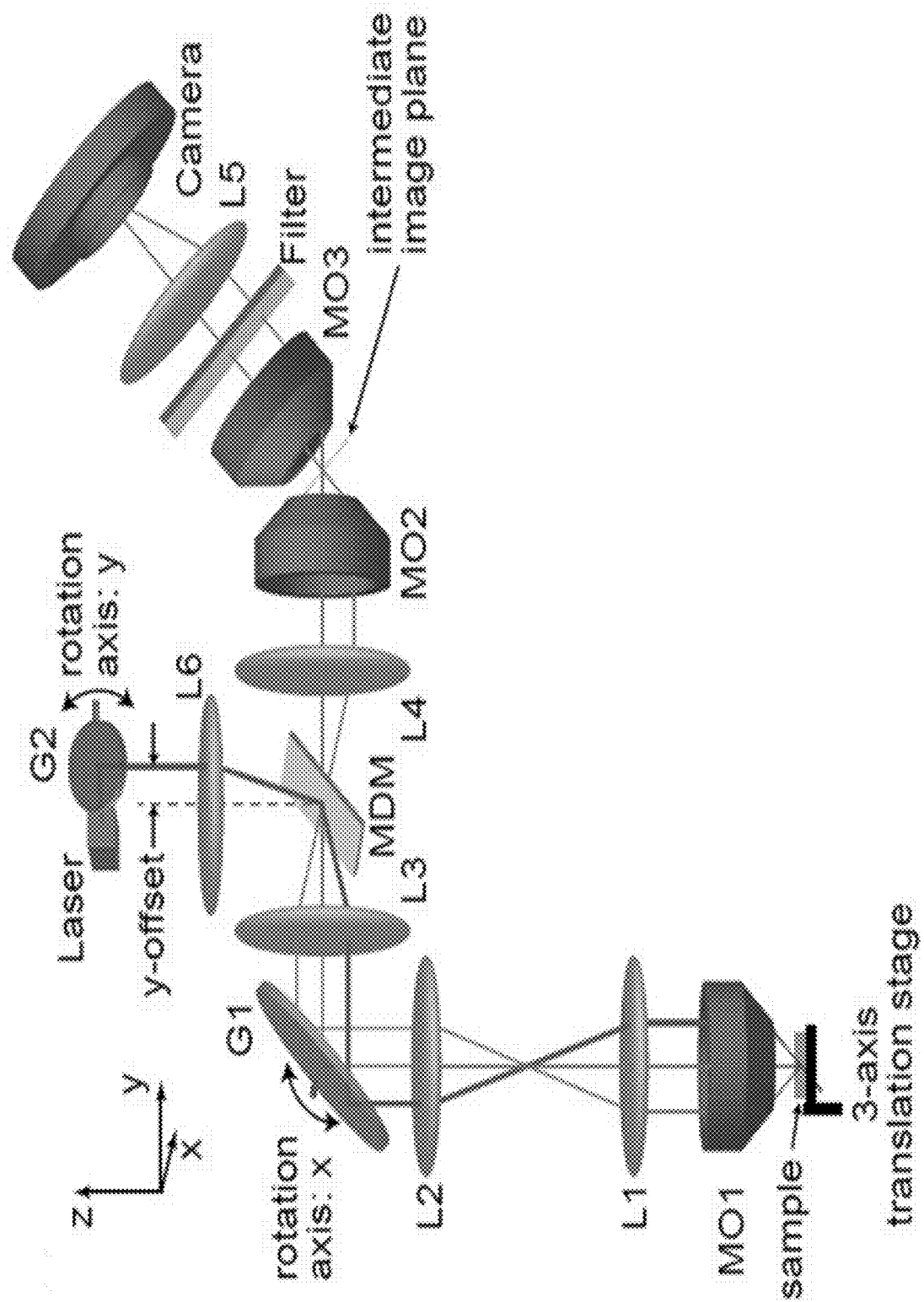
FIG. 9A depicts a 1p-SOPi system for improved imaging performance and depth penetration in accordance with an illustrative embodiment.
Figure 9C:
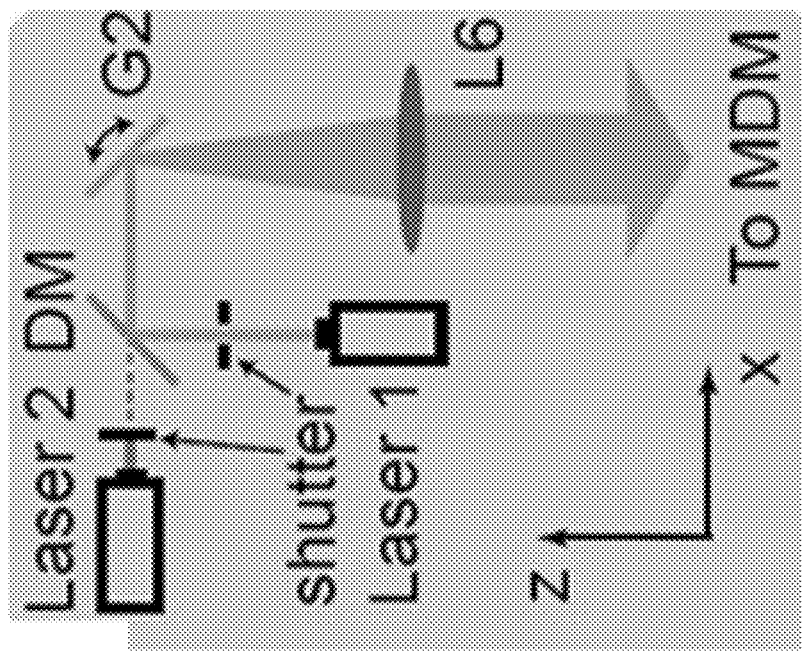
FIG. 9C depicts a dual laser arrangement for 2 color imaging with the system of FIG. 9A in accordance with an illustrative embodiment.
Figure 9B:
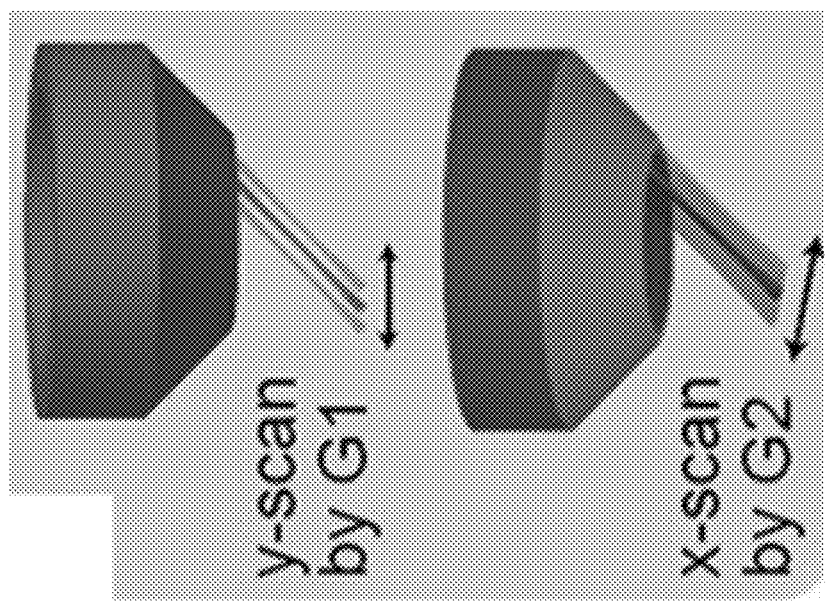
FIG. 9B depicts schematics that show the role of G1 and G2 (from FIG. 9A) in tilt-invariant scanning and the creation of light-sheets in accordance with an illustrative embodiment.

FIG. 9A depicts a 1p-SOPi system for improved imaging performance and depth penetration in accordance with an illustrative embodiment. The system utilizes the DSLM approach, as described herein. FIG. 9B depicts schematics that show the role of G1 and G2 (from FIG. 9A) in tilt-invariant scanning and the creation of light-sheets in accordance with an illustrative embodiment. FIG. 9C depicts a dual laser arrangement for 2 color imaging with the system of FIG. 9A in accordance with an illustrative embodiment.

The system of FIG. 9A is arranged such that the rotation axes of the galvanometers G1 (e.g., QS-12, 10 mm aperture, Nutfield Technology) and G2 (e.g., GVSM001, Thorlabs) lie in conjugate planes of one other. Further, the rotation axis of G1 is in a conjugate plane to back-focal planes (BFP) of both MO1 (e.g., 20×, NA 1.0 W, XLUMPLFLN20 W, Olympus) and MO2 (e.g., 20×, NA 0.75, UPLSAPO20X, Olympus). This arrangement ensures that rotation of G1 and G2 provides tilt-invariant scanning as represented in FIG. 9B. The illumination unit, unlike in earlier discussed SOPi embodiments, includes a laser 1 (e.g., 473 nm, violet/blue DPSS laser, Dragon Lasers) and laser 2 (e.g., 532 nm, green DPSS laser, DJ532-40, Thorlabs), combined and co-aligned through a dichroic mirror/beam-splitter (e.g., FF495-Di03, Semrock). Fast scanning of G2 creates a light-sheet as shown in FIG. 9C. A multiband dichroic mirror (e.g., Di03-R405/488/532/635, Semrock) reflects the light-sheet illumination towards the sample and allows emitted fluorescence to pass. The amount of y-offset in the illumination beam determines the tilt of the light-sheet in the sample space, and for this setup, it remains ~3.54 mm, corresponding to 45° tilt.

In the system of FIG. 9A, the choice of converging lenses L1-L6 determines the effective magnification of the system. They must be chosen carefully, so that i) lateral and axial magnification at the intermediate image plane in front of MO2 are equal to the ratio of refractive indices of MO1 and MO2 immersion media; and ii) overall system magnification is optimized to the effective camera pixel size in the sample space. The first requirement minimizes optical aberrations while imaging an oblique plane, while the second requirement optimizes resolution and field of view of the system. Achromatic doublet lenses from Thorlabs with focal lengths f=200 mm (L1, AC508-200-A-ML), f=100 mm (L2, AC508-100-A-ML; L3, AC254-100-A-ML; L6, AC254-100-A-ML), f=150 mm (L4, AC254-150-A-ML), and f=80 mm (L5, AC254-80-A-ML) were used in one implementation. The value of the focal length of L5 was decided based on the choice of MO3 (20×, NA 0.45, LUCPLFLN20X, Olympus), the effective NA 0.34 of the system, and the pixel size 5.86 (1920×1200 pixels, GS3-U3-23S6M-C, Grasshopper3, FLIR) of the camera used. This resulted in an effective magnification of 11.82× for the system, leading to pixel size in the sample space of ≈0.5 µm, which is approximately one half of the microscope's lateral resolution (0.61×λ/NA). This matching of focal length to camera pixel size and system NA optimizes resolution performance while maintaining a large field of view (here, ~950 µm along the x-axis). In alternative embodiments, different components may be used to form the system.

During imaging experiments using the system of FIG. 9, a manual 3-axis translation stage (PT3/M, Thorlabs) was used to position the sample within the field of view of the SOPi system. A custom MATLAB graphical user interface (GUI) control software was used to send ramp voltage signals to the galvo scanners via a data acquisition card (DAQ, PCIe-6321, National Instruments) on a computing device, and µManager was used for camera control and image acquisition.

Figure 10A:
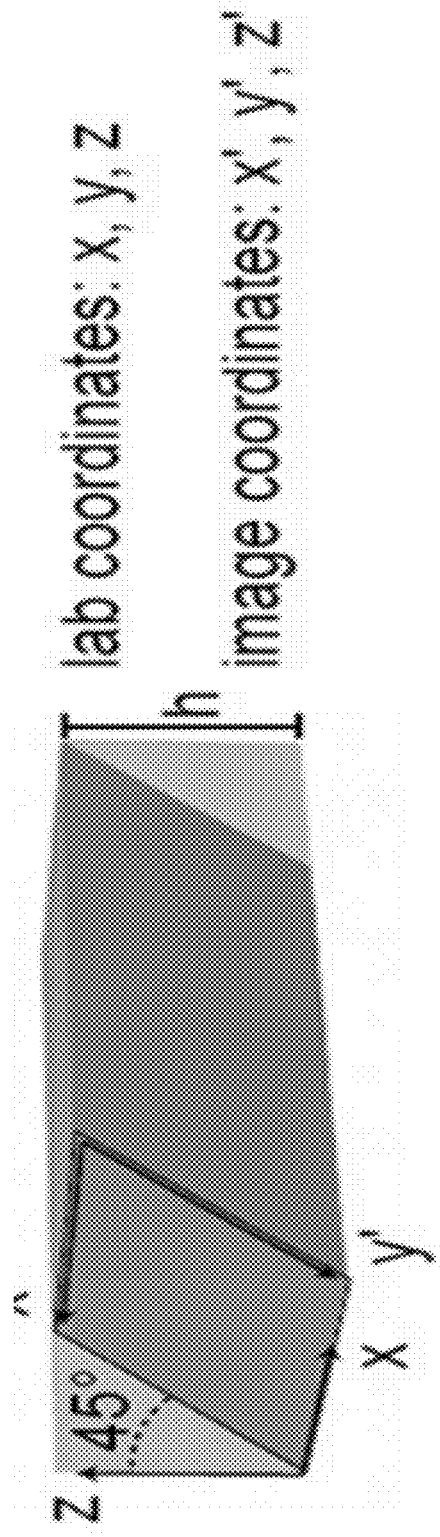
FIG. 10A illustrates the orientation of an acquired volume tile in accordance with an illustrative embodiment.
Figure 10B:
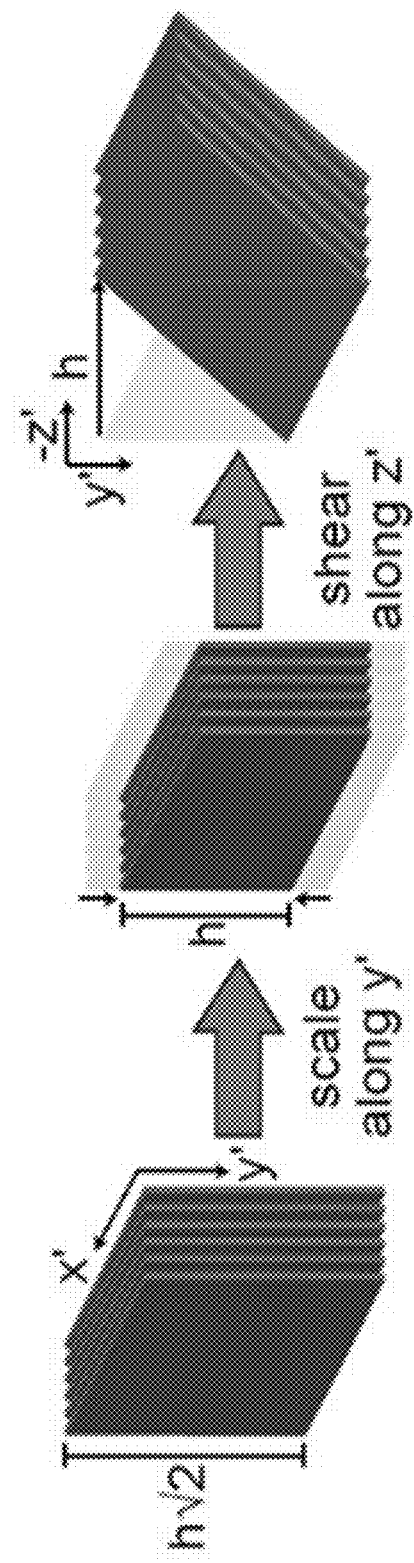
FIG. 10B depicts geometrical transformations used to position an image stack in correct 3D orientation in accordance with an illustrative embodiment.
Figure 10C:
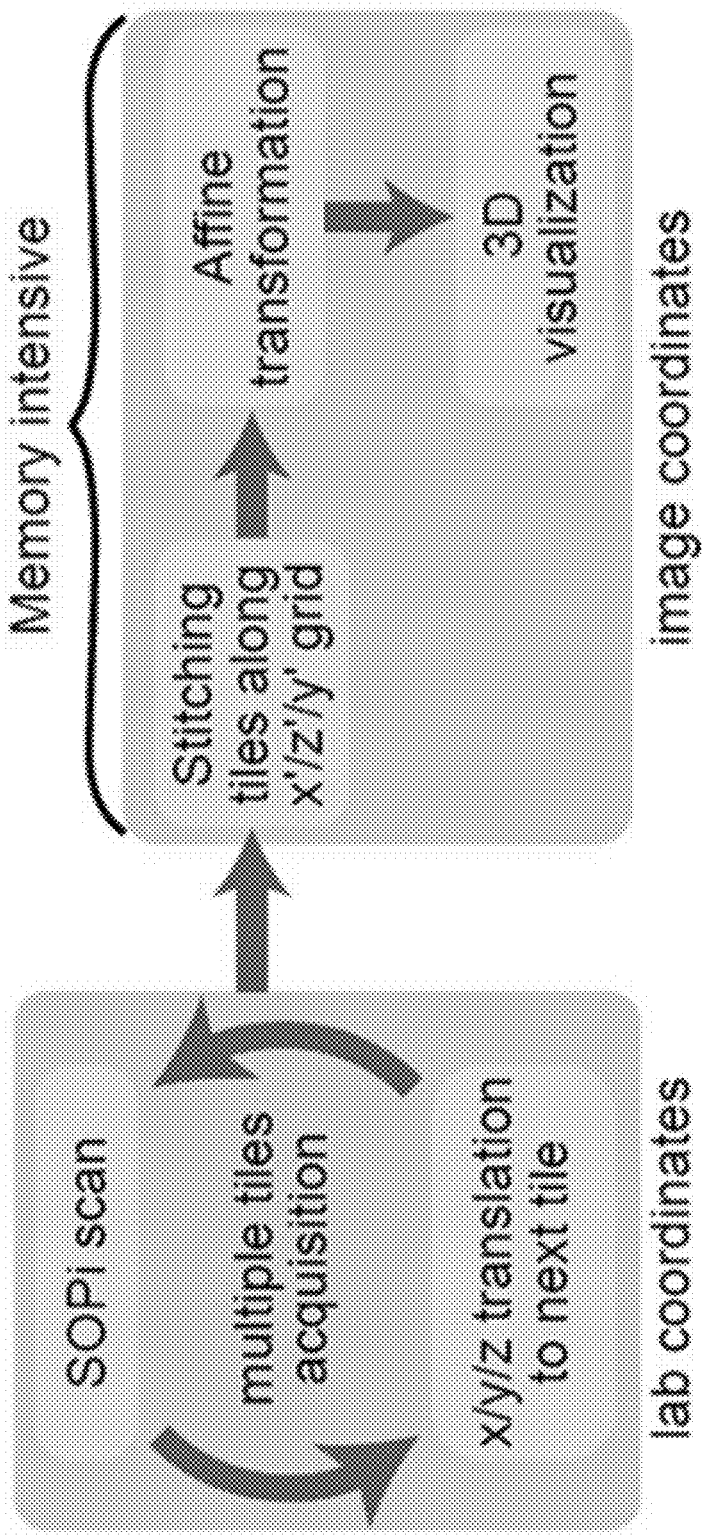
FIG. 10C depicts a processing pipeline for acquiring, stitching, and 3D visualization of multiple SOPi tiles in accordance with an illustrative embodiment.

A single sweep of an oblique light-sheet from the proposed SOPi system acquires an image stack corresponding to a sheared cuboid shaped volume, with its edges predictably misaligned relative to the translation stage Cartesian coordinates (x,y,z). FIG. 10A illustrates the orientation of an acquired volume tile in accordance with an illustrative embodiment. FIG. 10B depicts geometrical transformations used to position an image stack in correct 3D orientation in accordance with an illustrative embodiment. FIG. 10C depicts a processing pipeline for acquiring, stitching, and 3D visualization of multiple SOPi tiles in accordance with an illustrative embodiment.

During processing of an image stack, 3D reconstruction software (e.g., Fiji/ImageJ, etc.) can be used to manage the data in alternate coordinates (x',y',z'), so the raw 3D volume representation (left, FIG. 10B) is incorrect. Nevertheless, the reconstructed volume retains co-linearity, due to the tilt-invariant scanning of SOPi. Therefore, the exact volume can be reconstructed by two simple geometrical transformations of scaling and shearing as depicted in FIG. 10B. In practice, a single 4×4 Affine transformation matrix can be used to produce the combined geometrical transformation using a transform plugin.

The proposed SOPi's tilt invariant scanning can also be used for stitching multiple tiles. As depicted in FIGS. 10A and 10B, even though Affine transformation places the tiles in correct orientation, two adjacent tiles can only be combined if they are stitched along the x' or y' direction. Tiles along the z' direction would not merge after the transform, due to the extra corner padding (of blank pixels) added to each individual tile during transform. The simplest solution to this problem is to stitch raw tiles in their original form, i.e. pre-Affine transformation, as depicted in the workflow of FIG. 10C. All the tiles are acquired by moving a translation-stage/sample, and the tiles are stitched together with stitching tools to form large volume data. Tiles acquired along the x, y and z axes in laboratory coordinates are stitched along the x', z' and y' axes in image coordinates, respectively. A single operation of Affine transformation on stitched volume data rearranges it into an exact 3D representation of the sample volume. This large volume data can be passed to a plugin, etc. post transformation for 3D visualization. It is noted that no deconvolution or other post-processing is required, however such additional post-processing could be implemented if desired.

Figure 11A:
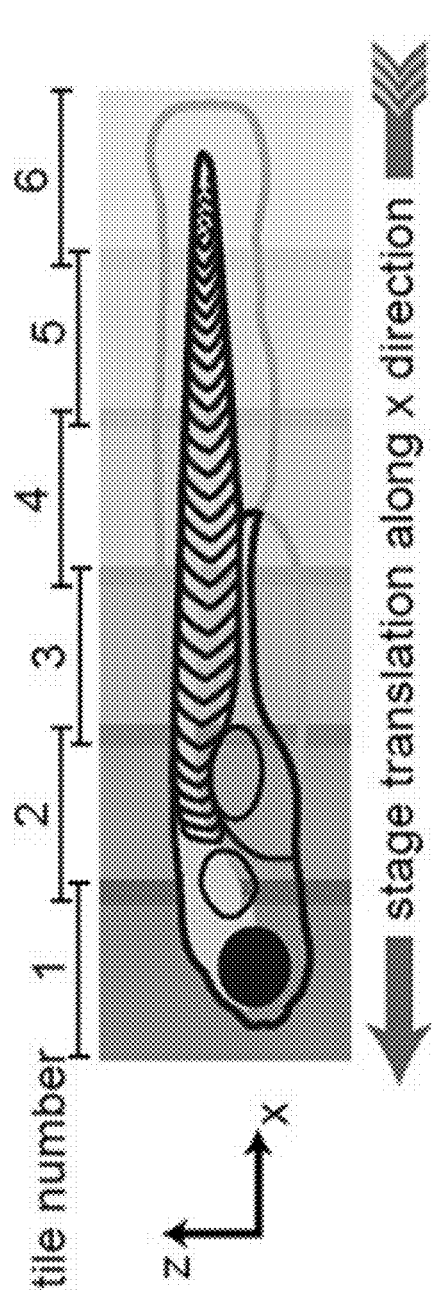
FIG. 11A depicts overlapping tiles along the length of a zebrafish larva for stitching along the x-axis in accordance with an illustrative embodiment.
Figure 11B:
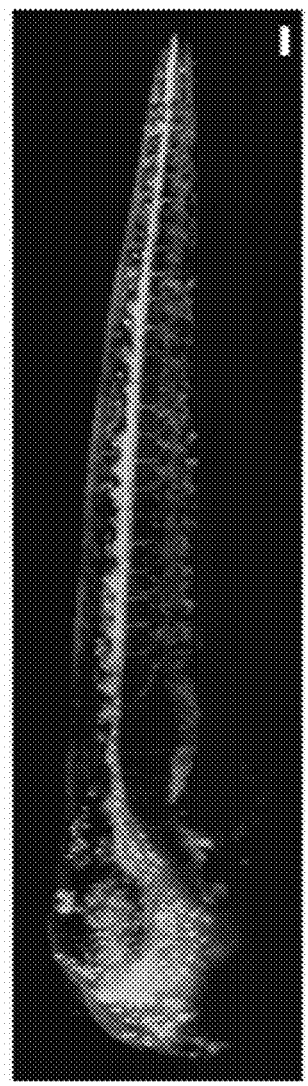
FIG. 11B depicts a perspective view of a first fluorescence channel of the zebrafish larva in accordance with an illustrative embodiment.
Figure 11C:
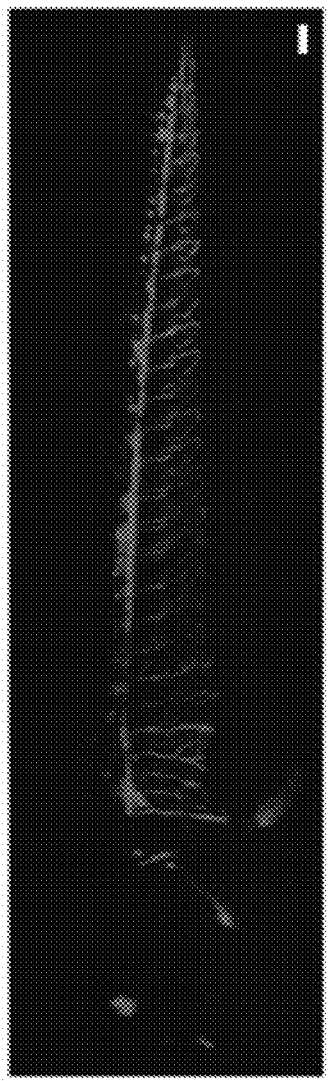
FIG. 11C depicts a perspective view of a second fluorescence channel of the zebrafish larva in accordance with an illustrative embodiment.

Examples of stitching SOPi tiles along the x, y and z axes are described below. FIG. 11A depicts overlapping tiles along the length of a zebrafish larva for stitching along the x-axis in accordance with an illustrative embodiment. FIG. 11B depicts a perspective view of a first fluorescence channel of the zebrafish larva in accordance with an illustrative embodiment. FIG. 11C depicts a perspective view of a second fluorescence channel of the zebrafish larva in accordance with an illustrative embodiment. In this first example, multiple tiles acquired by translation along the x-axis are stitched together. An agar gel embedded with a 4 dpf (days post fertilization) zebrafish embryo from an olig2:GFP cross to mnx:Gal4;UAS:pTagRFP was used. The zebrafish was oriented with its length along the x-axis, and a total of six overlapping tiles were acquired with manual translation of the stage to cover an ~4 mm length (brain and spinal cord) as illustrated in FIG. 11A. Each SOPi tile was acquired at 50 fps, with G2 driven at 100 Hz, and the light-sheet was scanned to cover 400 μm along the y-axis in 6 seconds. In the processing pipeline, each tile was first scaled down along the x' and y' directions to one half (to reduce data size). Tiles were stitched pairwise, Affine transformed, and visualized using ImageJ plugins. Imaging was performed for green and red fluorescence channels separately, and 3D reconstruction of the entire zebrafish is presented in FIGS. 11B and 11C.

Figure 12A:
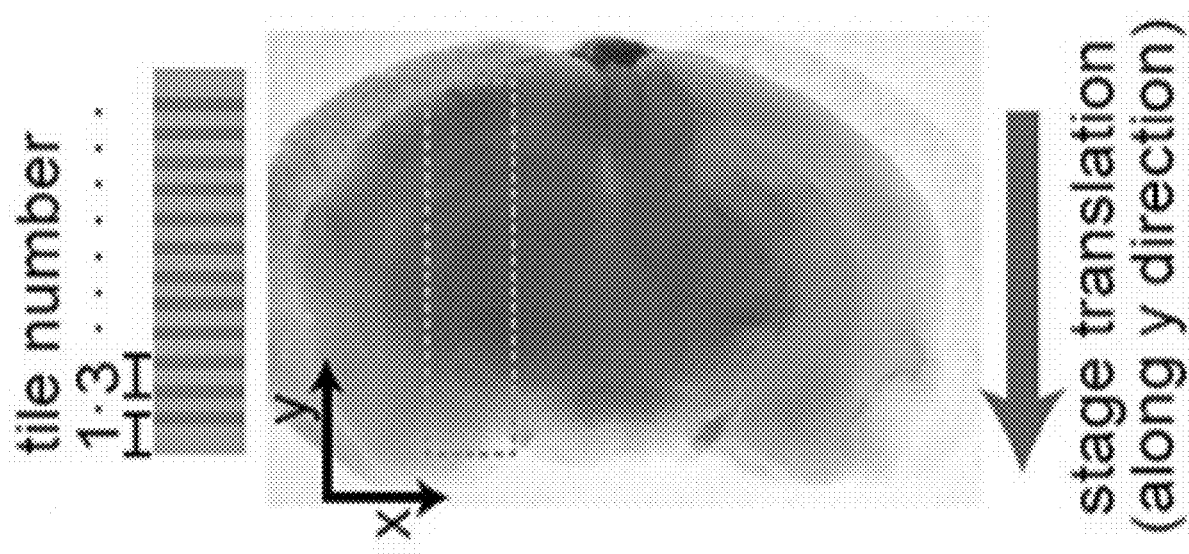
FIG. 12A depicts a tile arrangement along a 1 mm thick mouse brain section in accordance with an illustrative embodiment.
Figure 12B:
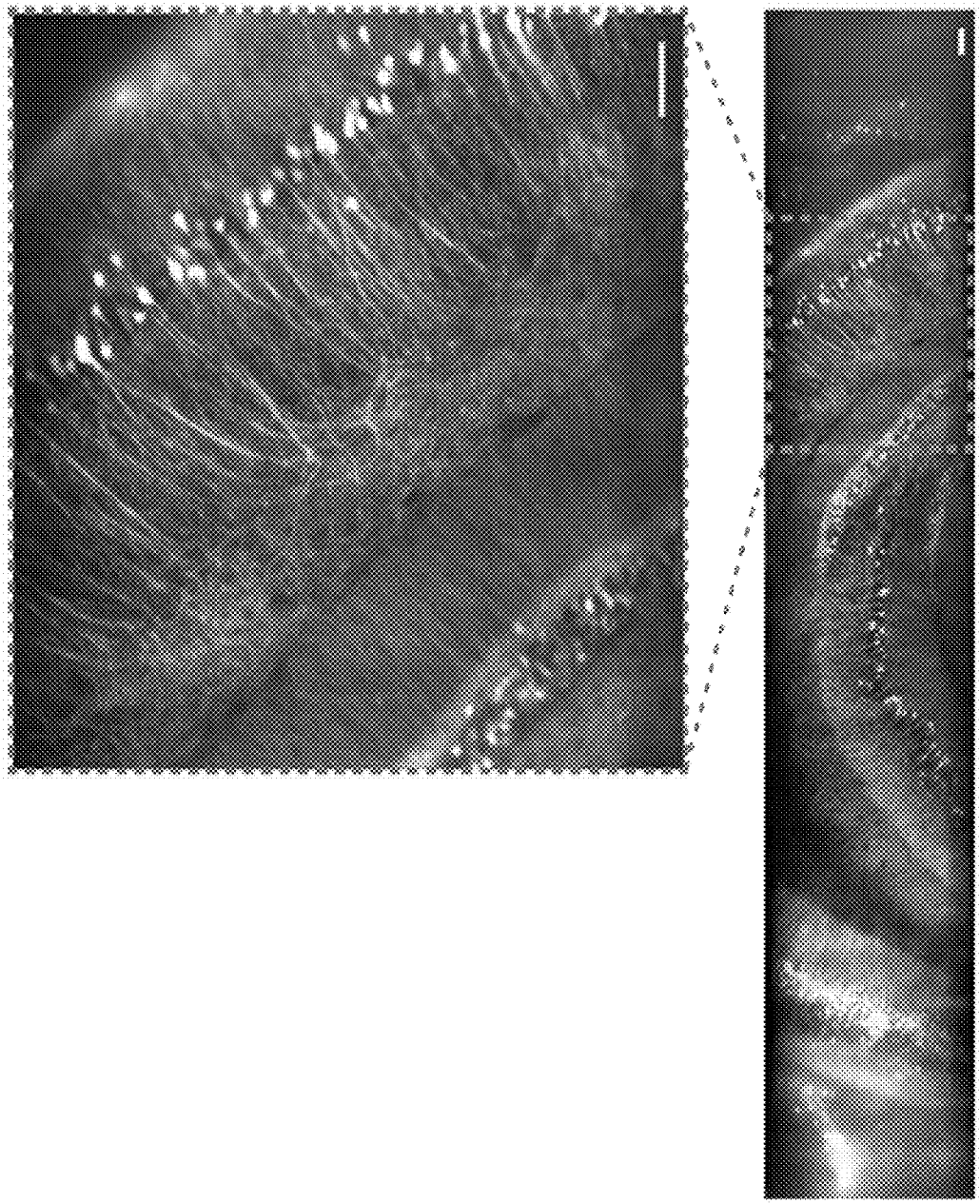
FIG. 12B depicts a virtual segment from the stitched dataset of FIG. 12A at a depth of 100 μm in accordance with an illustrative embodiment.

In a second example, stitching of multiple tiles acquired along the y-axis is performed. FIG. 12A depicts a tile arrangement along a 1 mm thick mouse brain section in accordance with an illustrative embodiment. FIG. 12B depicts a virtual segment from the stitched dataset of FIG. 12A at a depth of 100 μm in accordance with an illustrative embodiment. FIG. 12B also includes an inset with an enlarged view of a portion of the virtual segment. For the example depicted in FIG. 12, 1 mm-thick, fixed, uncleared coronal Thy1-GFP mouse brain sections through the hippocampus were used. The slice (FIG. 12A) was translated along y-axis in steps of ~200 μm to cover an ~4.75 mm length through multiple overlapping tiles. Each tile spanning 250 μm was acquired in 5 seconds at 50 fps, with G2 driven at 100 Hz. The scan range was restricted to 250 μm for uniform illumination throughout the y-sweep. The BigStitcher program was used to stitch the tiles (after rescaling each tile along x' and y' direction to one half), transformJ was used to perform an Affine transform, and BigDataViewer was used to visualize the volume. In alternative embodiments, other programs/applications may be used. The stitched volume spans ~0.95 mm×4.75 mm×0.3 mm (>1 mm$^3$). As shown in the stitched volume at a depth of 100 μm (FIG. 12B), all of the cell bodies and dendrites are clearly visible.

Figure 13A:
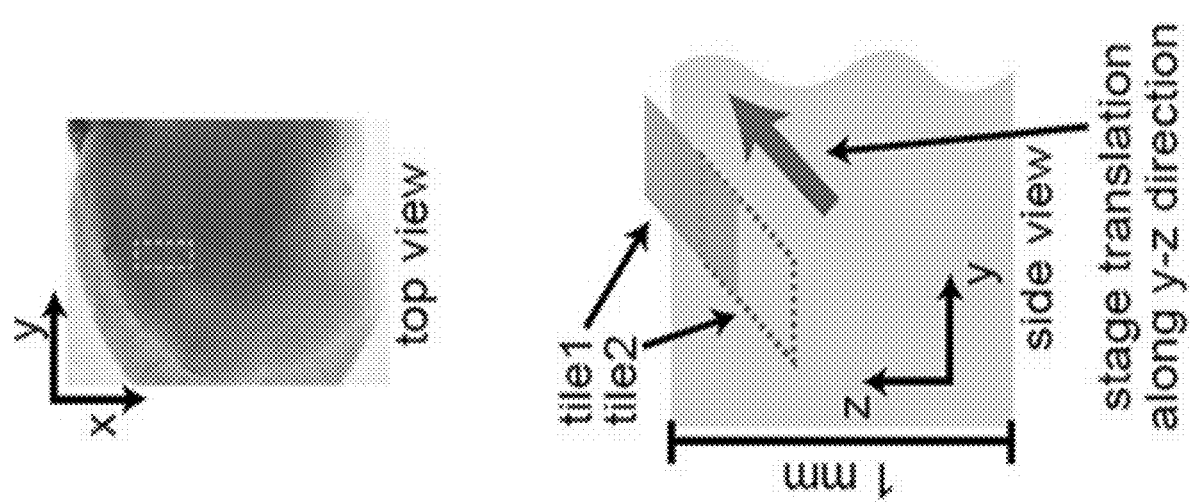
FIG. 13A depicts placement and orientation of tiles collected along the z-axis of a mouse brain section in accordance with an illustrative embodiment.
Figure 13B:
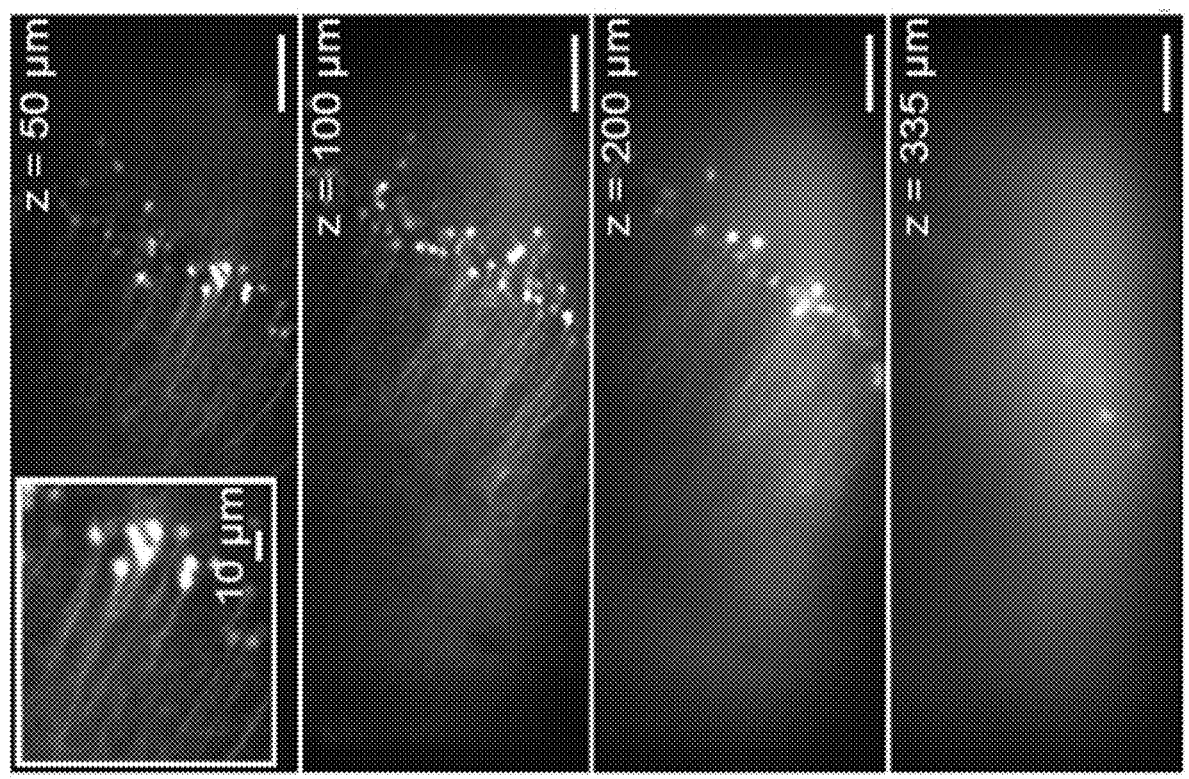
FIG. 13B depicts virtual z-slices along the depth of the stitched volume of the mouse brain section in accordance with an illustrative embodiment.

In another example, stitching along the z-axis is demonstrated. FIG. 13A depicts placement and orientation of tiles collected along the z-axis of a mouse brain section in accordance with an illustrative embodiment. FIG. 13B depicts virtual z-slices along the depth of the stitched volume of the mouse brain section in accordance with an illustrative embodiment. More specifically, FIG. 13A illustrates how two connected SOPi tiles along a depth of the sample are acquired by simultaneous movement of the sample along the y and z axis. Two overlapping tiles in the same mouse brain section were acquired by translating the sample diagonally by ~250 μm. Each tile was acquired at 50 fps, spanning 400 μm in 6 seconds. Tiles were scaled down (to one half along the x' and y' axes), stitched pairwise, Affine transformed, and visualized with BigDataViewer. In this dataset, the depth penetration capability of the proposed SOPi system becomes apparent. Neurons are visible at greater than a depth of 330 μm, with dendritic processes well-resolved at more superficial depth in the optically scattering mouse brain section. This depth performance exceeds any existing single objective one-photon light-sheet microscopy approach.

Thus, the examples above demonstrate an improved 1p-SOPi illumination architecture to obtain better optical sectioning capability to image deeper in scattering samples. In addition, it has been shown that it is possible to obtain large-scale volumetric imaging by stitching multiple volume scans together. These advances make SOPi suitable for in vivo imaging in mice as well as large sample imaging in other organisms. Moreover, the proposed implementation supports acquisition of high-quality imaging data at reasonable speed with basic, inexpensive cameras. The use of high-sensitivity cameras (e.g., sCMOS cameras) would further speed up volume acquisitions. Since scanning during a tile acquisition is done remotely with galvo scanners, and the sample remains motionless, there are no mechanical vibration artifacts. Thus, a simple manual translation stage is sufficient for large volume stitching, unlike in conventional light-sheet approaches. With the help of an automated translation stage and a workstation for data processing, experiments can be significantly scaled up, e.g. to image multiple zebrafish in parallel, or other large samples. Additionally, the currently available choices of higher NA objectives and post-processing algorithms enables future SOPi implementations to image at sub-dendritic and even molecular resolutions.

As also described herein, the SOPi microscopy system with its integrated 1P and 2P light-sheet imaging capability is a valuable and potentially broadly applicable system. While 1P imaging allows for rapid volumetric imaging exceeding 10 volumes per second, 2P imaging has better imaging capability for imaging light-scattering samples. Longer excitation wavelength of 2P light-sheet provides better resolution with no shadow artifacts, when compared to its 1P counterpart. With a 2P light-sheet, the improved resolution comes at the cost of reduced speed. Nevertheless, as a line-scan approach, it is still an order of magnitude faster than point scanning approaches like confocal microscopy or conventional 2-photon laser scanning microscopy. The SOPi microscopy system is capable of rapid volumetric imaging exceeding 10 volumes per second, limited by camera sensitivity and speed. In one embodiment, the SOPi microscopy system has relatively small overall numerical aperture, but superior high-cost objectives can be used to increase the overall system NA and therefore push the attainable resolution to a sub-micron scale for applications such as single molecule imaging. Use of higher NA objectives would help gather more light, thereby increasing the overall imaging speed for both 1P and 2P implementations. The current 2P light-sheet implementation was based on scanning low NA Gaussian beams. A Bessel beam 2P light-sheet implementation could also be used to further improve the penetration depth and resolution of the SOPi microscopy system.

The proposed SOPi microscopy system is an improvement to single objective based scanned oblique planar excitation microscopy. In comparison to other existing single objective based light-sheet microscopy approaches, the SOPi implementation is characterized by a simplified design and allows for true shape 3D reconstruction of a scanned volume. The simplified design of the SOPi microscopy system makes it easy to expand functionality in the system. Straightforward modifications include extending the system for simultaneous, multichannel imaging by introduction of an emission splitting system. Single objective based light-sheet microscopy can also include lattice light-sheet or Airy light-sheet approaches with further modification in the illumination architecture. Other sets of modifications can be made by introducing additional elements between the galvanometer and camera to incorporate extended depth of field based imaging approaches.

In an illustrative embodiment, the SOPi microscopy system can include and/or be in communication with a computing system that includes a memory, processor, user interface, transceiver, and any other computing components. Any of the operations described herein may be performed by the computing system. The operations can be stored as computer-readable instructions on a computer-readable medium such as the computer memory. Upon execution by the processor, the computer-readable instructions are executed as described herein. As an example, FIG. 14 depicts a computing device 1400 for use with any of the systems described herein.

Figure 14:
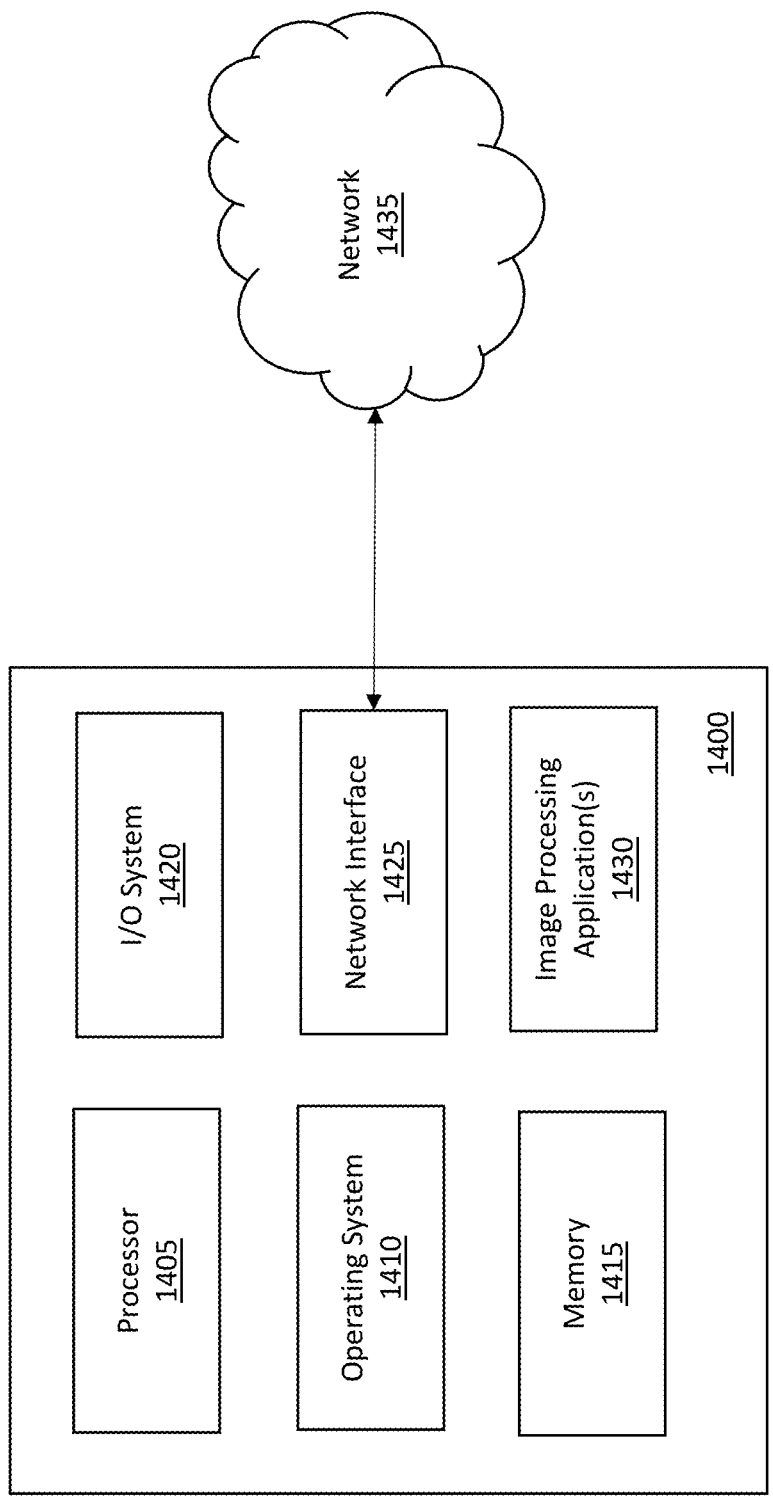
FIG. 14 is a block diagram of a computing device in communication with a network in accordance with an illustrative embodiment.

Specifically, FIG. 14 is a block diagram of a computing device 1400 in communication with a network 1435 in accordance with an illustrative embodiment. The computing device 1400 can be part of an imaging system and/or any other type of computing device that participates in or interacts with the proposed system. The computing device 1400 includes a processor 1405, an operating system 1410, a memory 1415, an input/output (I/O) system 1420, a network interface 1425, and image processing application(s) 1430. In alternative embodiments, the computing device 1400 may include fewer, additional, and/or different components. The components of the computing device 1400 communicate with one another via one or more buses or any other interconnect system. The computing device 1400 can be any type of networked computing device such as a laptop computer, desktop computer, smart phone, tablet, gaming device, workstation, server, camera system, etc.

The processor 1405 can be in electrical communication with and used to control any of the SOPi systems described herein. The processor 1405 can be any type of computer processor known in the art, and can include a plurality of processors and/or a plurality of processing cores. The processor 1405 can include a controller, a microcontroller, an audio processor, a graphics processing unit, a hardware accelerator, a digital signal processor, etc. Additionally, the processor 1405 may be implemented as a complex instruction set computer processor, a reduced instruction set computer processor, an x86 instruction set computer processor, etc. The processor 1405 is used to run the operating system 1410, which can be any type of operating system.

The operating system 1410 is stored in the memory 1415, which is also used to store programs, user data, network and communications data, peripheral component data, the image processing application(s) 1430, and other operating instructions. The memory 1415 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1420 is the framework which enables users and peripheral devices to interact with the computing device 1400. The I/O system 1420 can include a mouse, a keyboard, one or more displays, a speaker, a microphone, etc. that allow the user to interact with and control the computing device 1400. The I/O system 1420 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 1425 includes transceiver circuitry that allows the computing device to transmit and receive data to/from other devices such as remote computing systems, servers, websites, etc. The network interface 1425 enables communication through a network 1435, which can be one or more communication networks. The network 1435 can include a cable network, a fiber network, a cellular network, a wi-fi network, a landline telephone network, a microwave network, a satellite network, etc. The network interface 1425 also includes circuitry to allow device-to-device communication such as Bluetooth® communication.

The image processing application(s) 1430 can include software and algorithms in the form of computer-readable instructions which, upon execution by the processor 1405, performs any of the various operations described herein such as stitching tiles in any of the x, y, and/or z directions, performing transformations, rendering images, solving matrices, solving equations, etc. The image processing application(s) 1430 can utilize the processor 1405 and/or the memory 1415 as discussed above. In an alternative implementation, the image processing application(s) 1430 can be remote or independent from the computing device 1400, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A microscopy system comprising:
a first excitation source configured to emit a one-photon light beam;
a second excitation source configured to emit a two-photon light beam;
a first optical component configured to deliver one or more of a one-photon light sheet and a two-photon light sheet, wherein the one-photon light sheet is based on the one-photon light beam and the two-photon light sheet is based on the two-photon light beam; and
a single reflective surface at a back focal plane of the first optical component to reflect the one or more of the one-photon light sheet and the two-photon light sheet toward a sample, wherein the single reflective surface rotates about a rotation axis situated at a cross section of the single reflective surface and the back focal plane of the first optical component.

2. The microscopy system of claim 1, wherein the first optical component comprises a lens or a microscope objective.

3. The microscopy system of claim 1, wherein the rotation axis of the single reflective surface is positioned, conjugated, or re-imaged at the back focal plane of the first optical component.

4. The microscopy system of claim 1, wherein the single reflective surface comprises a galvanometer based planar mirror, and further comprising a driver board that is configured to control the galvanometer based planar mirror.

5. The microscopy system of claim 1, further comprising an optical arrangement to convert and combine one or more of the one-photon light beam and the two-photon light beam into the one or more of the one-photon light sheet and the two-photon light sheet.

6. The microscopy system of claim 1, wherein the one or more of the one-photon light sheet and the two-photon light sheet are positioned, relayed, or imaged at an off-axis location relative to the single reflective surface such that the one or more of the one-photon light sheet and the two-photon light sheet are re-imaged at an off-axis location relative to the back focal plane of the first optical component to form one or more oblique light sheets that are positioned at an angle relative to a principal axis of the first optical component or a sample plane on which the sample is positioned.

7. The microscopy system of claim 6, wherein rotation of the single reflective surface causes a pure translation of the one or more oblique light sheets in front of the first optical component without a change in tilt angle.

8. The microscopy system of claim 6, wherein the first optical component is also configured to receive a light signal from the sample, wherein the light signal is emitted from different depths of the sample responsive to the one or more oblique light sheets.

9. The microscopy system of claim 8, further comprising a second optical component which is positioned, conjugated, or re-imaged such that a back focal plane of the second optical component matches the rotation axis of the single reflective surface, wherein rotation of the single reflective surface is configured to de-scan the light signal received from the first optical component and to direct the light signal to a stationary intermediate image plane in front of the second optical component.

10. The microscopy system of claim 9, further comprising an imaging sub-system, wherein the stationary intermediate image plane is magnified by any combination of a lens, a microscope objective, a tube lens, and a camera, and wherein the camera is configured to capture the light signal during rotation of the single reflective surface to generate a three-dimensional representation of the sample.

11. The microscopy system of claim 10, further comprising a processor configured to apply an affine transformation matrix to camera-acquired data to obtain a true shape three-dimensional reconstruction of the sample, wherein the affine transformation matrix comprises a product of a shearing matrix and a scaling matrix.

12. A method of forming images with a microscopy system, the method comprising:
positioning a first excitation source such that a one-photon light beam emitted from the first excitation source is configured to contact a galvanometer mounted planar reflector at an offset relative to a rotation axis of the galvanometer mounted planar reflector;
positioning a second excitation source such that a two-photon light beam emitted from the second excitation source is configured to contact the galvanometer mounted planar reflector at the offset relative to the rotation axis of the galvanometer mounted planar reflector;
positioning the galvanometer mounted planar reflector at an angle relative to both the one-photon light beam and the two-photon light beam, wherein the galvanometer mounted planar reflector rotates about a fixed axis;
aligning a first microscope objective, on a first side of the galvanometer mounted planar reflector, such that a back focal plane of the first microscope objective is located, conjugated, or imaged at the rotation axis of the galvanometer mounted planar reflector, wherein the first microscope objective is configured to direct one or more of a one-photon light sheet and a two-photon light sheet toward a sample;
aligning a second microscope objective, on a second side of the galvanometer mounted planar reflector, such that a back focal plane of the second microscope objective is located, conjugated, or imaged at the rotation axis of the galvanometer mounted planar reflector;
receiving, by the first microscope objective, reflected, scattered, or emitted light signals coming from different depths of the sample, wherein the light signals are produced due to interaction of the one or more of the one-photon light sheet and the two-photon light sheet with the sample; and
forming, based on the received light signals refracted through the second microscope objective, an intermediate stationary image of a scanned oblique section within the sample.

13. The method of claim 12, further comprising:
magnifying the intermediate stationary intermediate image plane by an imaging sub-system that includes any combination of a third microscope objective, a tube lens, and a camera; and
positioning the camera such that the camera receives the light signals from different depths of the sample so that the camera is able to form the magnified stationary image.

14. The method of claim 12, further comprising:
positioning one or more optical elements to expand, collimate, and focus one or more of the one-photon light beam and the two-photon light beam to form a focused line beam; and
positioning the galvanometer mounted planar reflector and one or more first optical lenses to generate a scanned light sheet in front of the first microscope objective based on the focused line beam, wherein the scanned light sheet comprises the one or more of the one-photon light sheet and the two-photon light sheet.

15. The method of claim 14, further comprising positioning one or more second lenses to re-image or conjugate the rotation axis of the galvanometer mounted planar reflector to the back focal plane of the first microscope objective and to the back focal plane of the second microscope objective.

16. The method of claim 12, further comprising:
positioning one or more first optical elements to perform beam shaping; and
incorporating one or more second optical elements between the galvanometer mounted planar reflector and a camera to modify imaging of the sample.

17. A microscopy system comprising:
a first excitation source configured to emit a first one-photon light beam to excite a first one-photon light signal and a second excitation source configured to emit a second one-photon light beam to excite a second one-photon light signal;
a dichroic mirror configured to combine and co-align the first one-photon light beam and the second one-photon light beam;
a first objective lens, a second objective lens, and a third objective lens, wherein a back focal plane of the first objective lens is conjugate to a back focal plane of the second objective lens, and wherein the third objective lens forms a magnified image;

a first galvanometer and a second galvanometer, wherein a first rotation axis of the first galvanometer and a second rotation axis of the second galvanometer lie in conjugate planes of one another, wherein the first rotation axis and the second rotation axis also lie in conjugation with the back focal plane of the first objective lens and the back focal plane of the second objective lens, and wherein the second galvanometer is configured to create a scanned light-sheet from one or more of the first one-photon light beam and the second one-photon light beam; and a multiband dichroic mirror configured to reflect the scanned light-sheet toward a sample to be imaged.

18. The microscopy system of claim 17, wherein the scanned light sheet has an oblique tilt due to an offset of the first one-photon light beam or the second one-photon light beam relative to the first rotation axis of the first galvanometer.

19. The microscopy system of claim 17, further comprising a camera configured to capture a plurality of image tiles corresponding to the sample, wherein the plurality of image tiles are generated responsive to interaction of the scanned light sheet with different depths of the sample and sample translation between consecutive tiles.

20. The microscopy system of claim 19, further comprising a processor operatively coupled to the camera and configured to:

stitch the plurality of image tiles together in one or more of an x-direction, a y-direction, and a z-direction;

perform an affine transformation on the stitched image tiles; and render the image of the sample based on the transformation of the stitched image tiles.

* * * * *